United States Patent
Ishikura et al.

(10) Patent No.: US 10,187,267 B2
(45) Date of Patent: Jan. 22, 2019

(54) DEVICE MANAGEMENT SYSTEM, DEVICE MANAGEMENT METHOD, AND SERVER APPARATUS

(71) Applicants: Koji Ishikura, Kanagawa (JP); Manami Kikuchi, Kanagawa (JP); Jun Satoh, Tokyo (JP)

(72) Inventors: Koji Ishikura, Kanagawa (JP); Manami Kikuchi, Kanagawa (JP); Jun Satoh, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 277 days.

(21) Appl. No.: 15/289,378

(22) Filed: Oct. 10, 2016

(65) Prior Publication Data

US 2017/0111235 A1    Apr. 20, 2017

(30) Foreign Application Priority Data

Oct. 15, 2015 (JP) .................................. 2015-204026
Mar. 17, 2016 (JP) .................................. 2016-053470
Aug. 15, 2016 (JP) .................................. 2016-159298

(51) Int. Cl.
G06F 15/177    (2006.01)
H04L 12/24    (2006.01)
H04L 12/26    (2006.01)

(52) U.S. Cl.
CPC .............. *H04L 41/20* (2013.01); *H04L 41/12* (2013.01); *H04L 41/22* (2013.01); *H04L 43/065* (2013.01); *H04L 43/0817* (2013.01)

(58) Field of Classification Search
CPC ......... H04L 41/20; H04L 41/12; H04L 41/22; H04L 43/065; H04L 43/0817
See application file for complete search history.

(56) References Cited

U.S. PATENT DOCUMENTS

| 2012/0229838 A1 | 9/2012 | Mogaki |
| 2013/0151678 A1 | 6/2013 | Fukasawa |

(Continued)

FOREIGN PATENT DOCUMENTS

| JP | 2012-190074 | 10/2012 |
| JP | 2013-122689 | 6/2013 |

(Continued)

*Primary Examiner* — Michael A Keller
*Assistant Examiner* — Austin J Moreau
(74) *Attorney, Agent, or Firm* — Harness, Dickey & Pierce, P.L.C.

(57) ABSTRACT

A device management system includes a device mapping unit configured to hold, in association with each piece of device management identification information indicating identification information for managing corresponding one of a plurality of devices, a device state indicating an installation state or an operating state of the device, device-specific identification information identifying the device, and installation planned device-specific identification information identifying a device that is planned to be replaced with the former device; and an update unit configured to, in response to receiving an installation request for a device, which includes device-specific identification information, replace device-specific identification information associated with device management identification information associated with installation planned device-specific identification information identical to the device-specific identification information included in the installation request, with the installation planned device-specific identification information.

18 Claims, 20 Drawing Sheets

(56) References Cited

U.S. PATENT DOCUMENTS

| | | | |
|---|---|---|---|
| 2014/0201263 A1* | 7/2014 | Ohashi | H04L 29/06047 |
| | | | 709/203 |
| 2014/0280445 A1 | 9/2014 | Hori | |
| 2014/0373103 A1* | 12/2014 | Hirata | G06F 21/31 |
| | | | 726/4 |
| 2015/0039377 A1* | 2/2015 | Baba | G06Q 10/06315 |
| | | | 705/7.25 |
| 2015/0212761 A1 | 7/2015 | Onose | |

FOREIGN PATENT DOCUMENTS

| | | |
|---|---|---|
| JP | 2014-063421 | 4/2014 |
| JP | 2014-179952 | 9/2014 |
| JP | 2014-197245 | 10/2014 |
| JP | 2015-027742 | 2/2015 |
| JP | 2015-141570 | 8/2015 |

* cited by examiner

FIG.4

| DEVICE CODE | INSTALLATION PLACE | DEVICE TYPE CODE | COUNTER INFORMATION | | | SETTING INFORMATION | | | |
|---|---|---|---|---|---|---|---|---|---|
| | | | PRINT-ING | SCANNER | ... | FW UPDATE | DATE SETTING | CARD R | ... |
| 10001 | XX CITY XX WARD XX BUILDING 2F | Imagio C333 | 299 | 53 | ... | AUTOMAT-IC | 2015/07/28 | USE | ... |
| 20001 | XX PREFECTURE XX CITY 3-1-8 | Imagio P55 | 300 | 0 | ... | MANUAL | 2015/08/02 | NOT USE | ... |
| ... | ... | ... | ... | ... | ... | ... | ... | ... | ... |

| MANAGE-MENT CODE | DEVICE STATE | INSTALLATION DEVICE CODE | INSTALLATION PLANNED DEVICE CODE |
|---|---|---|---|
| AC32 | OPERATING | 00324 | - |
| XZ11 | BEING REPLACED | 10001 | 20001 |
| JM31 | NOT INSTALLED | - | - |
| ⋮ | ⋮ | ⋮ | ⋮ |

| MANAGEMENT CODE | JOB TYPE | JOB STATE | DATE AND TIME OF GENERATION |
|---|---|---|---|
| AC32 | PRINTING | COMPLETED | 2015-11-20 12:00:00 |
| XZ11 | READING | COMPLETED | 2015-11-24 12:01:47 |
| XZ11 | PRINTING | COMPLETED | 2015-11-24 15:13:26 |
| XZ11 | READING | CANCELED | 2015-11-26 14:20:04 |
| XZ11 | READING | COMPLETED | 2015-11-26 14:26:53 |
| XZ11 | PRINTING | COMPLETED | 2015-11-26 16:38:19 |
| XZ11 | PRINTING | COMPLETED | 2015-11-27 18:06:31 |
| ⋮ | ⋮ | ⋮ | ⋮ |

FIG.7

| MANAGE-MENT CODE | EXECUTION CONTENT | DEVICE CODE | REPLACEMENT DESTINATION DEVICE CODE | EXECUTION STATE | DATE AND TIME OF EXECUTION |
|---|---|---|---|---|---|
| XZ11 | INSTALLED | 10001 | - | COMPLETED | 2014-02-01 09:18:25 |
| AC32 | INSTALLED | 00324 | - | COMPLETED | 2015-11-20 14:03:46 |
| XZ11 | REPLACED | 10001 | 20001 | COMPLETED | 2015-06-01 15:42:01 |
| ... | ... | ... | ... | ... | ... |

T4

DEVICE MANAGEMENT SYSTEM, DEVICE MANAGEMENT METHOD, AND SERVER APPARATUS

CROSS-REFERENCE TO RELATED APPLICATIONS

The present application claims priority under 35 U.S.C. § 119 to Japanese Patent Application No. 2015-204026, filed Oct. 15, 2015, Japanese Patent Application No. 2016-053470, filed Mar. 17, 2016 and Japanese Patent Application No. 2016-159298, filed Aug. 15, 2016. The contents of which are incorporated herein by reference in their entirety.

BACKGROUND OF THE INVENTION

1. Field of the Invention

The present invention relates to a device management system, a device management method, and a server apparatus.

2. Description of the Related Art

In replacing a device such as an image forming apparatus, a technique of backing up a current set value and restoring the set value to the device after the replacement is known.

A printer server disclosed in Japanese Unexamined Patent Application Publication No. 2014-63421 holds a correspondence relation between a user ID and a printer identification ID therein. When receiving a print job, the printer server specifies a printer that performs printing based on the user ID of the received print job. The printer server converts the received print job into a print job corresponding to the specified printer, and transmits the print job to the specified printer. Thus, Japanese Unexamined Patent Application Publication No. 2014-63421 discloses the printer server that can mitigate inconvenience of print setting for each terminal apparatus.

However, the printer server disclosed in Japanese Unexamined Patent Application Publication No. 2014-63421 only rewrites information of the printer server in replacing the printer, and the information is limited to printer printing. Counter information, setting information, and the like cannot be taken over. Thus, an administrator and the like cannot easily replace the device such as a printer. Another related technique is described in Japanese Unexamined Patent Application Publication No. 2015-27742, for example.

SUMMARY OF THE INVENTION

A device management system includes one or more computers and is configured to manage a plurality of devices connected to each other via a network. The device management system includes a device information management unit, an extracting unit, an acquisition unit, a device mapping unit, a determining unit, and an update unit. The device information management unit is configured to hold, in association with each piece of device-specific identification information indicating identification information specific to corresponding one of the plurality of devices, device type information indicating a device type of the device and installation place information indicating an installation place of the device. The extracting unit is configured to, in response to receiving a replacement request for a device, which includes device-specific identification information, extract device type information and installation place information held in association with the device-specific identification information included in the replacement request. The acquisition unit is configured to transmit the extracted device type information and the extracted installation place information to an external apparatus, and acquire installation planned device-specific identification information indicating identification information specific to a device that is planned to be replaced with the former device, from the external apparatus. The device mapping unit is configured to hold, in association with each piece of device management identification information indicating identification information for managing corresponding one of the plurality of devices, a device state indicating an installation state or an operating state of the device, device-specific identification information, and installation planned device-specific identification information. The determining unit is configured to, in response to receiving an installation request for a device, which includes device-specific identification information, determine whether there is device management identification information held in association with installation planned device-specific identification information identical to the device-specific identification information included in the installation request, in the device management identification information held by the device mapping unit. The update unit is configured to, if the determining unit determines that there is the device management identification information held in association, and an operating state that is specified by a device state held in association with the device management identification information is "being replaced", update the device state from "being replaced" to "operating", replace the device-specific identification information held in association with the device management identification information with the installation planned device-specific identification information and then eliminate the installation planned device-specific identification information to thereby replace the device-specific identification information associated with the device management identification information with the installation planned device-specific identification information.

BRIEF DESCRIPTION OF THE DRAWINGS

FIG. 4 is an explanatory diagram illustrating an example of a data configuration of a device management table;

FIG. 5 is an explanatory diagram illustrating an example of a data configuration of a management code table;

FIG. 6 is an explanatory diagram illustrating an example of a data configuration of a job management table;

FIG. 7 is an explanatory diagram illustrating an example of a data configuration of an installation history table;

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
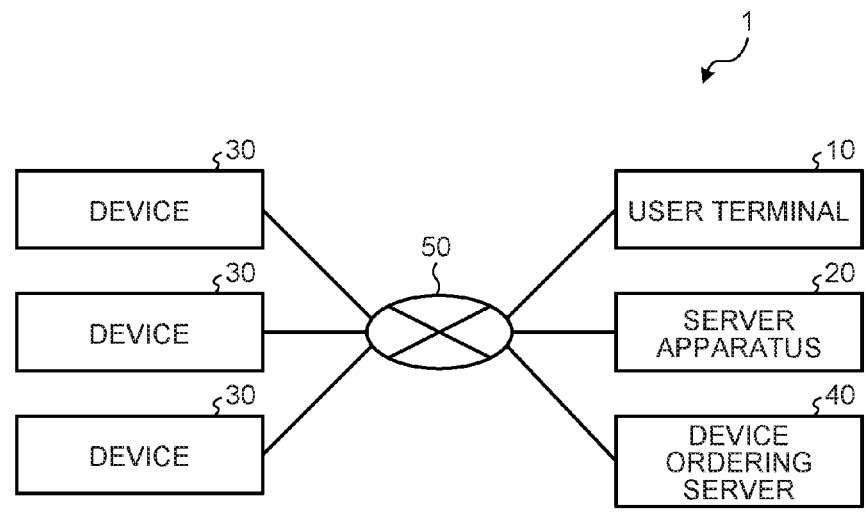
FIG. 1 is an explanatory diagram illustrating an example of a device management system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

The following describes embodiments of a device management system, a device management method, and a server apparatus in detail with reference to the attached drawings. The embodiments described below are embodiments of the device management system, the device management method, and the server apparatus, and do not limit a configuration, specifications, and the like thereof.

An embodiment has an object to provide a device management system, a device management method, and a server apparatus that can easily take over various pieces of information in replacing a device.

FIG. 1 is an explanatory diagram illustrating an example of a device management system 1 according to an embodiment. The device management system 1 illustrated in FIG. 1 includes a user terminal 10, a server apparatus 20, one or a plurality of devices 30, and a device ordering server 40. The user terminal 10, the server apparatus 20, one or a plurality of devices 30, and the device ordering server 40 are connected to each other in a communicable manner via a network 50 such as a virtual private network (VPN), a local area network (LAN), and the Internet. That is, the device management system 1 is a system for managing a plurality of devices 30 configured of one or more computers and connected to each other via the network 50.

The user terminal 10 is an information processing apparatus such as a personal computer, a tablet terminal, and a smartphone used by a user. For example, the user terminal 10 receives an operation for submitting a job (a unit of a job to be executed by a computer) to each device 30 included in the device management system 1. The device management system 1 illustrated in FIG. 1 includes one user terminal 10. Alternatively, the device management system 1 may include a plurality of user terminals 10.

The server apparatus 20 is an information processing apparatus for managing a use state of each device 30 so that each user terminal 10 can efficiently use each device 30 included in the device management system 1. That is, the server apparatus 20 requests to execute the job submitted to each device 30 when the job is submitted from the user terminal 10. The server apparatus 20 may be a cloud service. That is, the server apparatus 20 may include one information processing apparatus, or may include a plurality of information processing apparatuses. All or part of pieces of information stored in the server apparatus 20 may be stored in another information processing apparatus, or all or part of functions of the server apparatus 20 may be included in another information processing apparatus.

The device 30 is, for example, an image forming apparatus having a predetermined function such as a copying function, a scanner function, a facsimile function, and a printer function. Alternatively, the device 30 may be a multifunction peripheral having at least two of the copying function, the scanner function, the facsimile function, and the printer function, or an information processing apparatus having another function. Although the device management system 1 illustrated in FIG. 1 includes three devices 30, the device management system 1 may include four or more devices 30, or may include two or less devices 30. Each device 30 may be connected to the network 50 via an access point and the like.

When receiving an order of new device 30, the device ordering server 40 notifies an ordering source of identification information for identifying the new device 30. The device ordering server 40 may be an external apparatus or an external system. Specifically, the device ordering server 40 may include one server, or may include a plurality of servers.

When receiving an operation for submitting a job for designating the device 30 to execute a predetermined function, the user terminal 10 transmits the job to the server apparatus 20. When receiving the job, the server apparatus 20 transmits the job to the device 30 designated by the user terminal 10. The device 30 executes a function related to the job transmitted from the server apparatus 20.

When receiving the notification of request to replace the device 30, the server apparatus 20 requests the device 30 to be newly installed from the device ordering server 40. When the device 30 is replaced, the server apparatus 20 sets various pieces of information to the device 30 after the replacement.

The server apparatus 20 records an execution history indicating that the device 30 has executed the function related to the job. The server apparatus 20 then generates a report R1 (refer to FIG. 14) indicating the use state of each device 30 included in the device management system 1 based on the recorded execution history.

Next, the following describes a hardware configuration of each apparatus included in the device management system 1.

Figure 2:
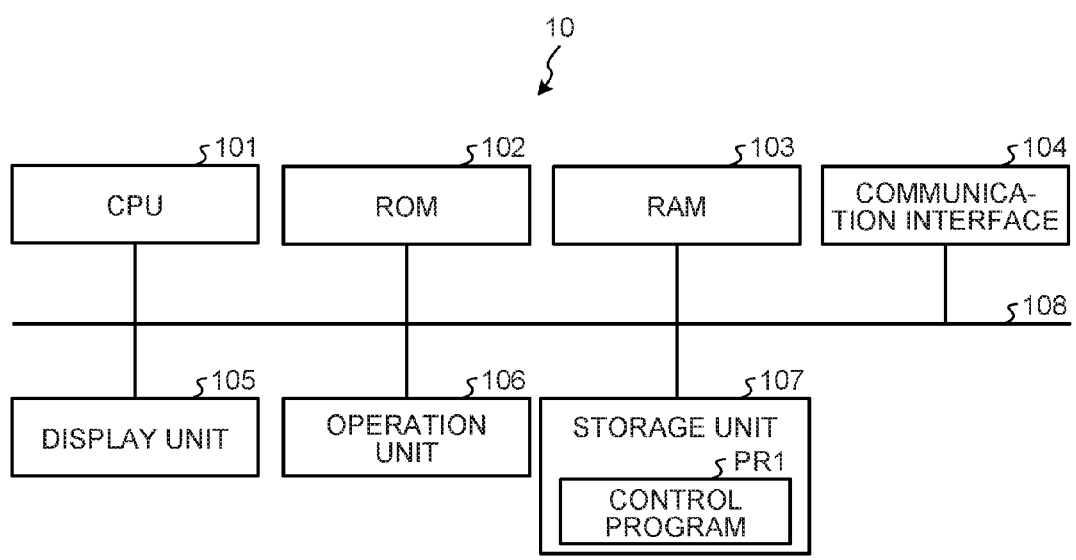
FIG. 2 is a block diagram illustrating an example of a hardware configuration of a user terminal.

First, the following describes a hardware configuration of the user terminal 10. FIG. 2 is a block diagram illustrating an example of the hardware configuration of the user terminal 10.

The user terminal 10 includes a central processing unit (CPU) 101, a read only memory (ROM) 102, a random access memory (RAM) 103, a communication interface 104, a display unit 105, an operation unit 106, and a storage unit 107. The CPU 101, the ROM 102, the RAM 103, the communication interface 104, the display unit 105, the operation unit 106, and the storage unit 107 are connected to each other via a bus line 108 such as an address bus and a data bus.

The CPU 101 loads a computer program stored in the ROM 102 or the storage unit 107 into the RAM 103. The CPU 101 operates in accordance with the computer program loaded into the RAM 103 to control the user terminal 10.

The communication interface 104 is an interface for communicating with each apparatus via the network 50.

The display unit 105 is, for example, a liquid crystal display apparatus (LCD). The operation unit 106 is an operation apparatus such as a touch panel, a keyboard, and a mouse. The operation unit 106 receives various inputs corresponding to the operation by the user.

The storage unit 107 is a non-volatile storage apparatus such as an HDD and an SSD. The storage unit 107 stores therein the computer program and the like including a control program PR1. The control program PR1 is a computer program for exhibiting a function of the user terminal 10.

Figure 3:
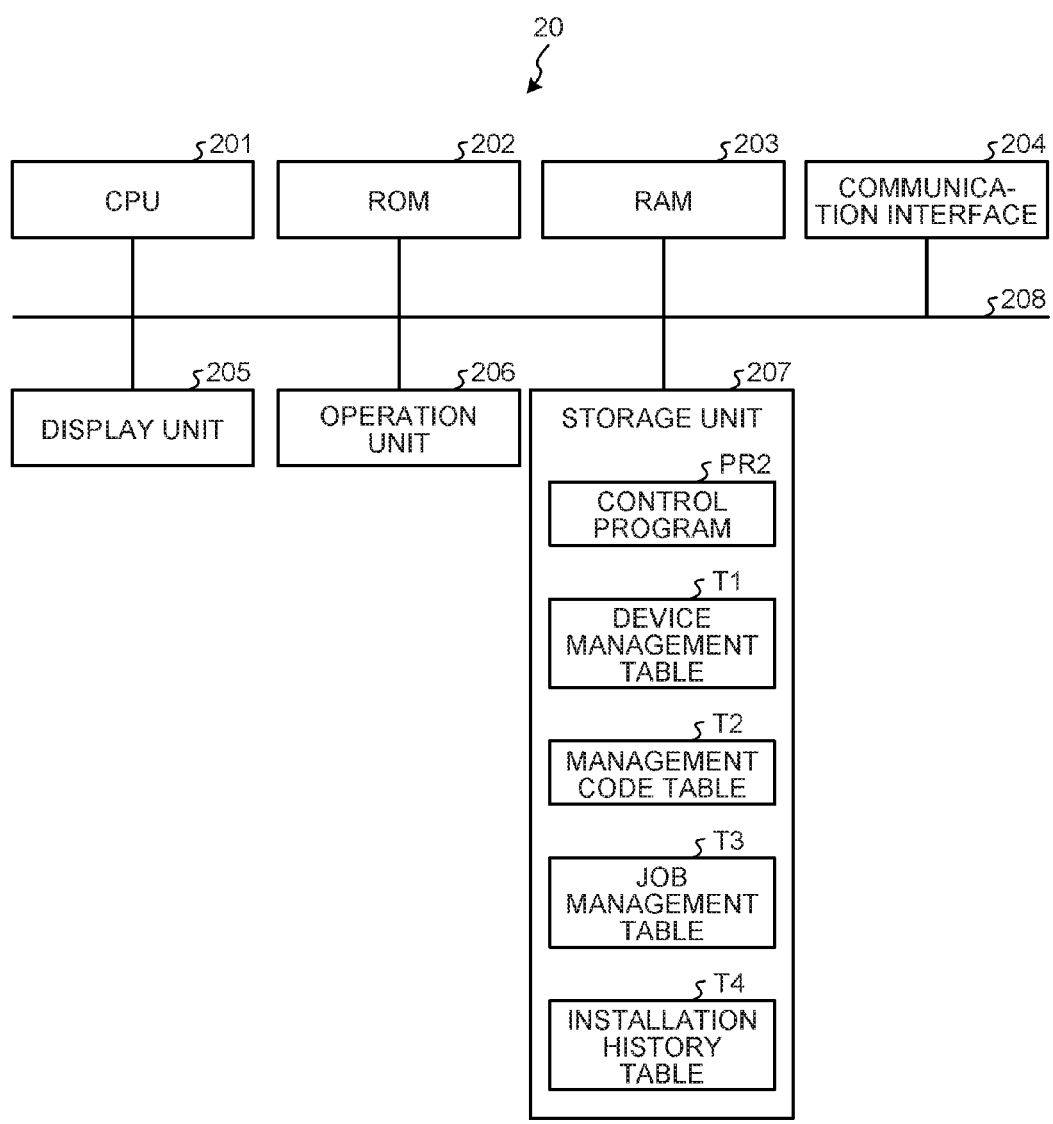
FIG. 3 is a block diagram illustrating an example of a hardware configuration of a server apparatus.

Next, the following describes a hardware configuration of the server apparatus 20. FIG. 3 is a block diagram illustrating an example of the hardware configuration of the server apparatus 20.

The server apparatus 20 includes a CPU 201, a ROM 202, a RAM 203, a communication interface 204, a display unit 205, an operation unit 206, and a storage unit 207. The CPU 201, the ROM 202, the RAM 203, the communication interface 204, the display unit 205, the operation unit 206, and the storage unit 207 are connected to each other via a bus line 208 such as an address bus and a data bus.

The CPU 201 loads a computer program stored in the ROM 202 or the storage unit 207 into the RAM 203. The CPU 201 operates in accordance with the computer program loaded into the RAM 203 to control the server apparatus 20.

The communication interface 204 is an interface for communicating with each apparatus via the network 50.

The display unit 205 is, for example, a liquid crystal display apparatus (LCD). The operation unit 206 is an operation apparatus such as a touch panel, a keyboard, and a mouse. The operation unit 206 receives various inputs corresponding to the operation by the user.

The storage unit 207 is a non-volatile storage apparatus such as an HDD and an SSD. The storage unit 207 stores therein the computer program and the like including a control program PR2. The control program PR2 is a computer program for exhibiting a function of the server apparatus 20. The storage unit 207 stores therein a device management table T1, a management code table T2, a job management table T3, and an installation history table T4.

The device management table T1 stores therein a state of each device 30 included in the device management system 1. FIG. 4 is an explanatory diagram illustrating an example of a data configuration of the device management table T1. In the device management table T1, a device code, an installation place, a device type code, counter information, and setting information are stored in association with each other. The device code is identification information for identifying the device 30. That is, the device code is device-specific identification information indicating identification information specific to each device 30. The installation place is, for example, an address indicating a place in which the device 30 is installed, a name of an area indicating a place in which the device 30 is installed, or the like. The device type code is identification information for identifying a device type of the device 30. That is, the device type code is device type information indicating the device type of the device 30. The device type code is notified from the device 30 at the time of first connection of the device 30 to the network 50. The counter information stores the number of times when the device 30 is used for each function. For example, the counter information stores the number of printed pages and the number of scanned pages. The counter information illustrated in FIG. 4 stores the number of times when the printing function and the scanner function are used. Alternatively, the counter information illustrated in FIG. 4 may store the number of times when another function is used. The setting information stores various setting states set in the device 30. The setting information illustrated in FIG. 4 stores setting states of a firmware (FW) update setting, a date setting, and a card reader (R) setting. Alternatively, the setting information illustrated in FIG. 4 may store another setting state. The FW update is a setting of a method of updating firmware. The date setting is a setting of the date. The card R is a setting of whether to use a card reader.

The management code table T2 stores therein a correspondence between a management code used for managing the use state of the device 30 and the device code. FIG. 5 is an explanatory diagram illustrating an example of a data configuration of the management code table T2. In the management code table T2, the management code, a device state, an installation device code, and an installation planned device code are stored in association with each other. That is, the management code table T2 is device state correspondence information indicating the device 30 associated with the management code and the state of the device 30.

The management code is identification information different from the device code used for managing the use state of the device 30. That is, the management code is device management identification information indicating the identification information for managing the device 30. For example, the management code is identification information for identifying an examination target of the use state of the device 30. More specifically, in a case of examining the use state of the device 30 at a predetermined installation place, the management code is identification information for identifying the installation place. In a case of examining the use state of the device 30 in a predetermined zone, the management code is identification information for identifying the zone. In a case of examining the use state of the device 30 in a predetermined group or individual, the management code is identification information for identifying the group or the individual.

The device state is information indicating an operating state of the device 30 associated with the management code. For example, the device state includes states of "not installed", "operating", and "being replaced". The state of "not installed" represents that the device 30 is not associated with the management code. The state of "operating" represents that the device 30 associated with the management code is operating. The state of "being replaced" represents that the device 30 associated with the management code is being replaced with another device 30.

The installation device code is information indicating a device code of the device 30 associated with the management code. When the device 30 is not associated with the management code, information indicating that there is no correspondence such as "-" is set to the installation device code. The installation planned device code is information indicating, when the device 30 associated with the management code is planned to be replaced with another device 30, the device code of the device 30 after the replacement. When the device 30 is not planned to be replaced, information indicating that the device 30 is not planned to be replaced such as "-" is set to the installation planned device code.

The job management table T3 stores therein an execution history of the job requested for each device 30 included in the device management system 1. FIG. 6 is an explanatory diagram illustrating an example of a data configuration of the job management table T3. In the job management table T3, the management code, a job type, a job state, and the date and time of generation are stored in association with each other. The management code is a management code associated with the device code of the device 30 that has executed the job. The job type indicates a type of a function executed by the device 30 based on the job. The job state is information indicating a state of the job. The job state includes states of "standby", "being executed", "completed", and "cancel". The state of "standby" represents that the job is in a standby state. The state of "being executed" represents that the job is being executed. The state of "completed" represents that the job is completed. The state of "cancel" represents that the job is canceled. The date and time of generation is information indicating the date and time on which the job executed by the device 30 is generated.

The installation history table T4 stores therein an installation history of each device 30 in the device management system 1 in association with the management code. FIG. 7 is an explanatory diagram illustrating an example of a data configuration of the installation history table T4. In the installation history table T4, the management code, execution content, the device code, a replacement destination device code, an execution state, and the date and time of execution are stored in association with each other. The management code is the management code described above. The execution content is information indicating content that has been executed. The execution content includes, for example, states of "installed", "replaced", and "removed". The state of "installed" represents that the device 30 is newly installed in the device management system 1. The state of "replaced" represents that the device 30 in the device management system 1 is replaced with another device 30. The state of "removed" represents that the device 30 in the device management system 1 is removed. The device code is an device code of the device 30 in which the execution content is executed. The replacement destination device code is information indicating, when the device 30 associated with the management code is replaced with another device 30, the device code of the device 30 after the replacement. The execution state is information indicating whether the content indicated by the execution content is completed. The date and time of execution is information indicating the date and time on which the content indicated by the execution content is executed.

Figure 8:
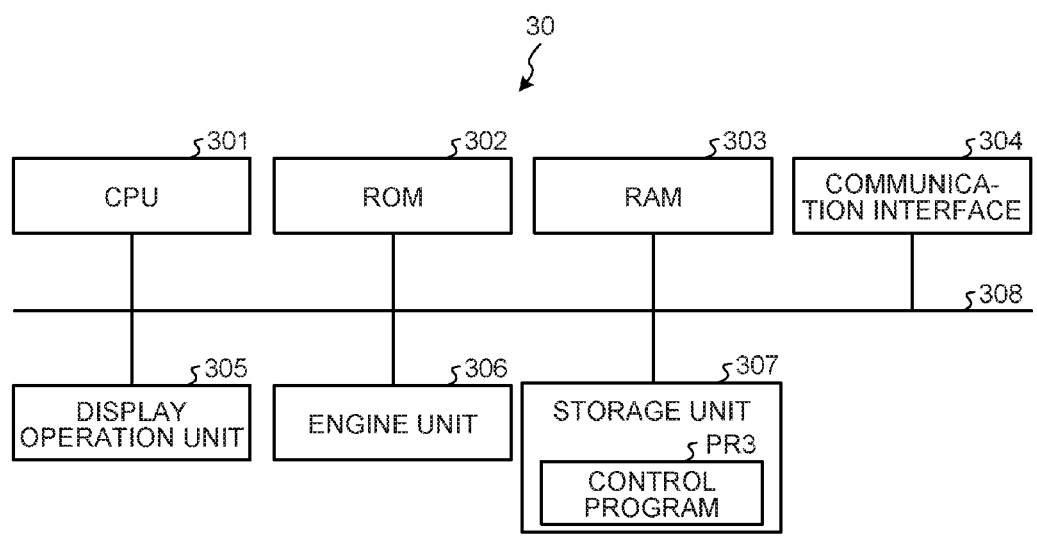
FIG. 8 is a block diagram illustrating an example of a hardware configuration of a device.

Next, the following describes a hardware configuration of the device 30. FIG. 8 is a block diagram illustrating an example of a hardware configuration of the device 30.

The device 30 includes a CPU 301, a ROM 302, a RAM 303, a communication interface 304, a display operation unit 305, an engine unit 306, and a storage unit 307. The CPU 301, the ROM 302, the RAM 303, the communication interface 304, the display operation unit 305, the engine unit 306, and the storage unit 307 are connected to each other via a bus line 308 such as an address bus and a data bus.

The CPU 301 loads a computer program stored in the ROM 302 or the storage unit 307 into the RAM 303. The CPU 301 operates in accordance with the computer program loaded into the RAM 303 to control the device 30.

The communication interface 304 is an interface for communicating with each apparatus via the network 50.

The display operation unit 305 is, for example, a liquid crystal display apparatus (LCD) including a touch sensor. The display operation unit 305 receives an operation by the user, and displays various pieces of information corresponding to the input. The display operation unit 305 may be configured of an organic electro luminescence (EL) display apparatus including the touch sensor. The display operation unit 305 may also include an operation unit and the like such as a hardware key arranged therein.

The engine unit 306 is hardware for implementing the scanner function, the printer function, and the like. The scanner function is a function of reading document data and generating a scanner image. The printer function is a function of performing image processing on the scanner image or image data transmitted from the outside, and printing a plotter image in a format that can be output on a print sheet.

The storage unit 307 is a non-volatile storage apparatus such as an HDD and an SSD. The storage unit 307 stores therein a computer program and the like including a control program PR3. The control program PR3 is a computer program for exhibiting a function of the device 30.

Figure 9:
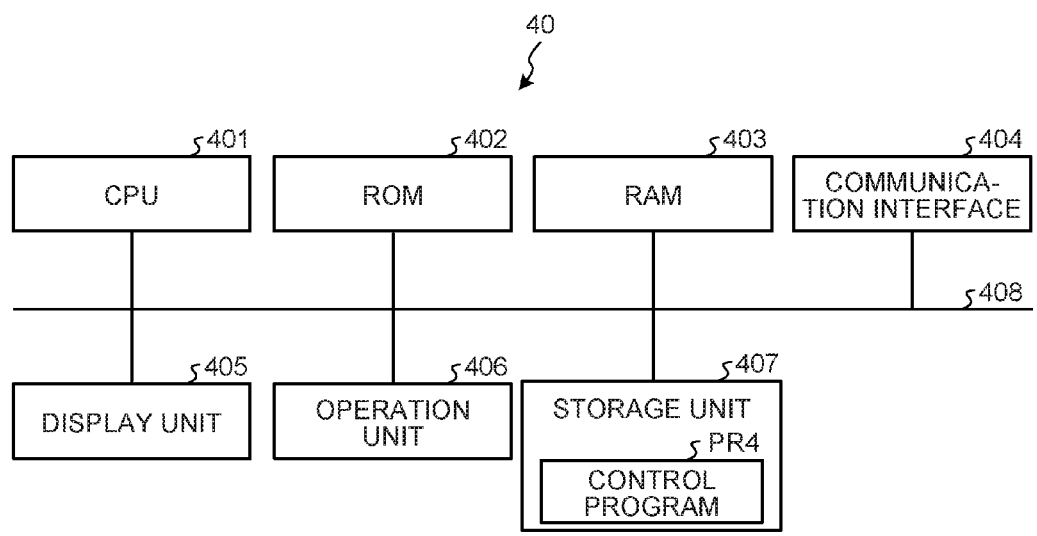
FIG. 9 is a block diagram illustrating an example of a hardware configuration of a device ordering server.

Next, the following describes a hardware configuration of the device ordering server 40. FIG. 9 is a block diagram illustrating an example of a hardware configuration of the device ordering server 40.

The device ordering server 40 includes a CPU 401, a ROM 402, a RAM 403, a communication interface 404, a display unit 405, an operation unit 406, and a storage unit 407. The CPU 401, the ROM 402, the RAM 403, the communication interface 404, the display unit 405, the operation unit 406, and the storage unit 407 are connected to each other via a bus line 408 such as an address bus and a data bus.

The CPU 401 loads a computer program stored in the ROM 402 or the storage unit 407 into the RAM 403. The CPU 401 operates in accordance with the computer program loaded into the RAM 403 to control the device ordering server 40.

The communication interface 404 is an interface for communicating with each apparatus via the network 50.

The display unit 405 is, for example, a liquid crystal display apparatus (LCD). The operation unit 406 is an operation apparatus such as a touch panel, a keyboard, and a mouse. The operation unit 406 receives various inputs corresponding to the operation by the user.

The storage unit 407 is a non-volatile storage apparatus such as an HDD and an SSD. The storage unit 407 stores therein a computer program and the like including a control program PR4. The control program PR4 is a computer program for exhibiting a function of the device ordering server 40.

Next, the following describes a characteristic function of each apparatus in the device management system 1.

Figure 10:
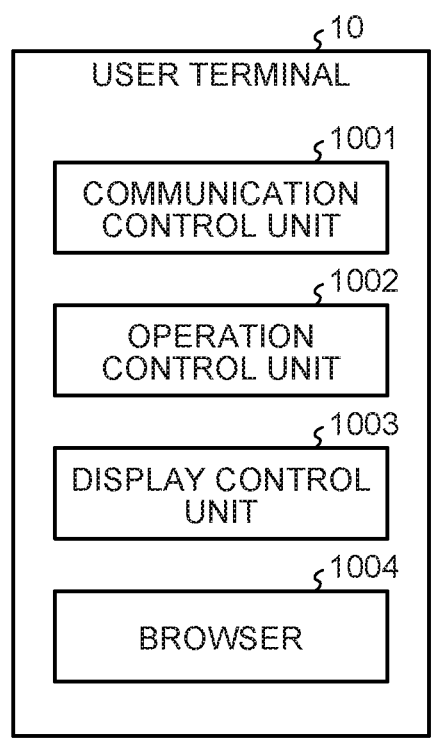
FIG. 10 is a block diagram illustrating an example of a functional block representing a characteristic functional configuration of the user terminal according to the embodiment.

FIG. 10 is a block diagram illustrating an example of a functional block representing a characteristic functional configuration of the user terminal 10 according to the embodiment. For convenience, FIG. 10 mainly exemplifies functions related to the embodiment. However, functions of the user terminal 10 are not limited thereto.

The CPU 101 of the user terminal 10 executes the control program PR1 and the like stored in the storage unit 107 to implement various functions. Specifically, the CPU 101 implements a communication control unit 1001, an operation control unit 1002, a display control unit 1003, and a browser 1004.

The communication control unit 1001 controls the communication interface 104 to control communication via the network 50.

The operation control unit 1002 controls the operation unit 106 to receive various operations. For example, the operation control unit 1002 receives an operation for designating the device 30 to be made to execute a job related to a predetermined function. When receiving the operation for submitting the job, the operation control unit 1002 causes the communication control unit 1001 to transmit the job to the designated server apparatus 20. Alternatively, the operation control unit 1002 receives an operation for designating the management code and requesting to generate the report R1 (refer to FIG. 14).

The display control unit 1003 controls the display unit 105 to display various screens. For example, when the operation control unit 1002 receives an operation for generating the report R1 (refer to FIG. 14), the display control unit 1003 causes the report R1 (refer to FIG. 14) to be displayed.

The browser 1004 causes the World Wide Web to be used and browsed in cooperation with the communication control unit 1001, the operation control unit 1002, and the display control unit 1003. That is, the browser 1004 displays a screen indicating various pieces of information such as the device management table T1 and the management code table T2 stored in the server apparatus 20. Additionally, the browser 1004 receives an operation for changing the various pieces of information on a screen indicating the various pieces of information.

Figure 11:
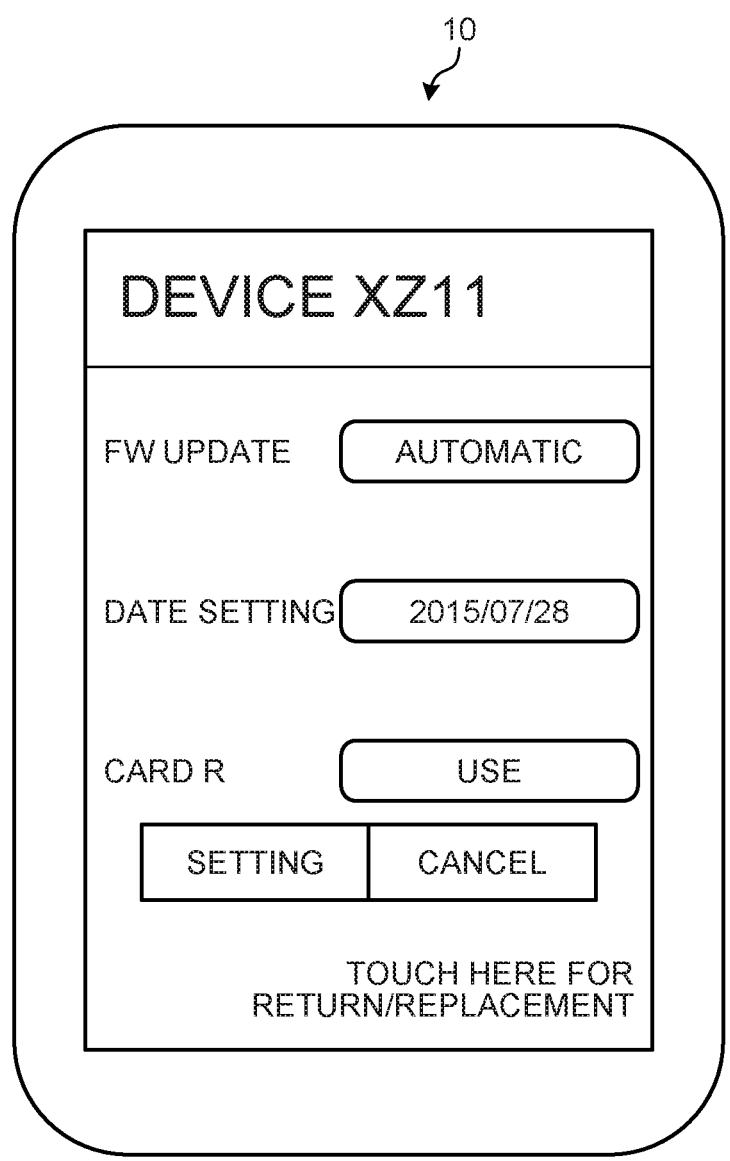
FIG. 11 is an explanatory diagram illustrating an example of a Web screen.

For example, the browser 1004 displays a Web screen for receiving a change of the setting information of each device 30 stored in the device management table T1. FIG. 11 is an explanatory diagram illustrating an example of the Web screen. The Web screen illustrated in FIG. 11 displays the setting information stored in the device management table T1 for the device code "10001" associated with the management code "XZ11" in the management code table T2. The Web screen illustrated in FIG. 11 displays FW update as a setting of a method of updating the firmware, date setting as a setting of the date, and card R as a setting of whether to use the card reader.

On the Web screen, for example, when the user touches a "setting" icon after touching "automatic" to be changed to "manual", which indicates the method of updating the firmware, the method of updating the firmware can be changed to "manual". Similarly, the user can change the date setting by touching the "setting" icon after touching "date" and inputting the date. Similarly, the user can change the card reader to "not use" by touching the "setting" icon after touching "use" to be changed to "not use". To cancel the input, the user touches the "cancel" icon. That is, the browser 1004 can update a changed item among items in the device management table T1.

When "touch here for return/replacement" on the Web screen illustrated in FIG. 11 is touched, the browser 1004 displays a selection screen G23 (refer to FIG. 17) for selecting replacement or return of the device 30. Accordingly, each user can easily perform operations for changing the setting information of the device 30, returning the device 30, and replacing the device 30 without going to the installation place of the device 30.

Figure 12:
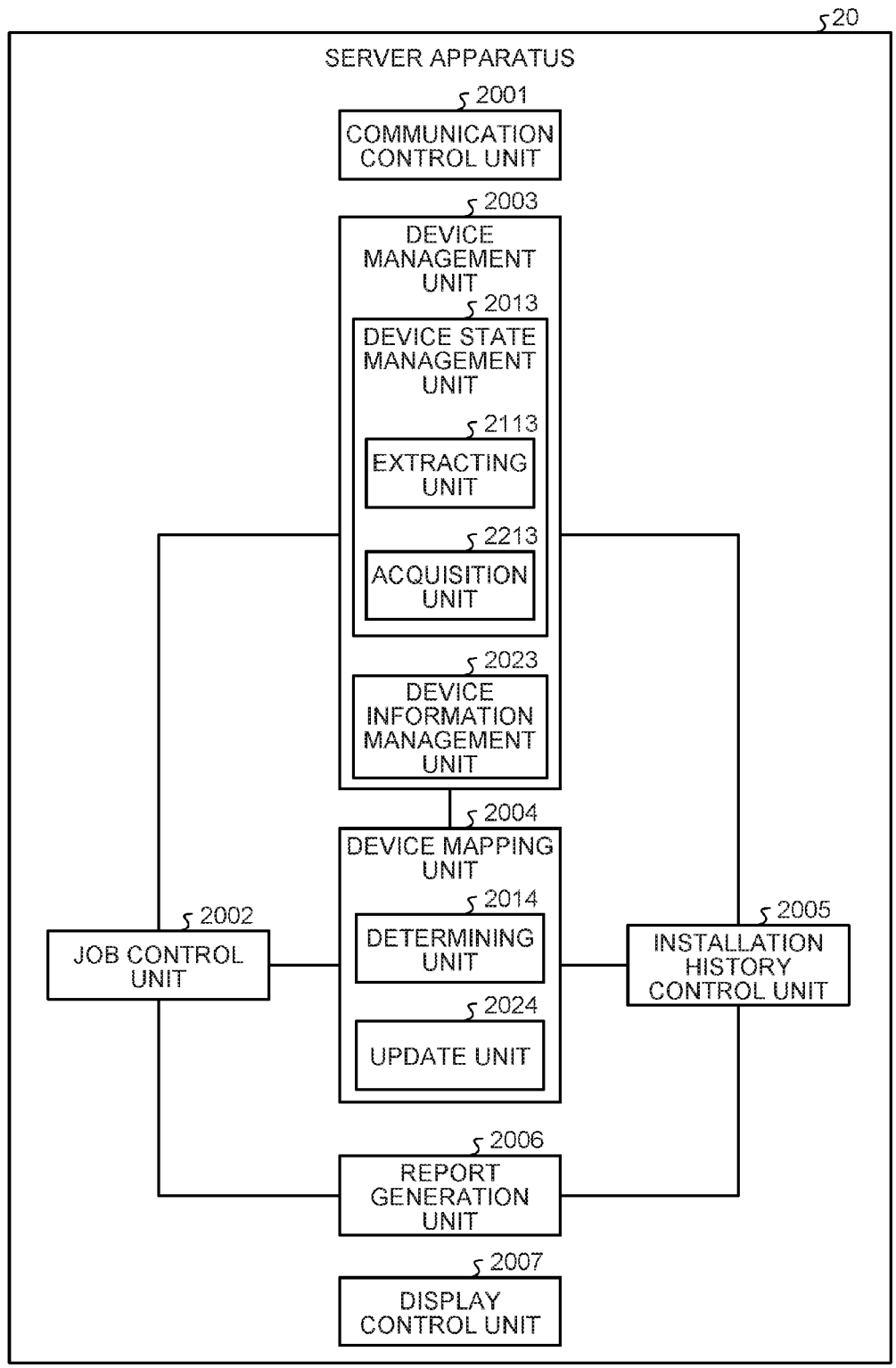
FIG. 12 is a block diagram illustrating an example of a functional block representing a characteristic functional configuration of the server apparatus according to the embodiment.

FIG. 12 is a block diagram illustrating an example of a functional block representing a characteristic functional configuration of the server apparatus 20 according to the embodiment. For convenience, FIG. 12 mainly exemplifies functions related to the embodiment. However, functions of the server apparatus 20 are not limited thereto.

The CPU 201 of the server apparatus 20 executes the control program PR2 and the like stored in the storage unit 207 to implement various functions. Specifically, the CPU 201 implements a communication control unit 2001, a job control unit 2002, a device management unit 2003, a device mapping unit 2004, an installation history control unit 2005, a report generation unit 2006, and a display control unit 2007.

The communication control unit 2001 controls the communication interface 204 to control communication via the network 50.

The job control unit 2002 manages execution of the job, and the job management table T3. For example, when receiving the job from the user terminal 10, the job control unit 2002 causes the communication control unit 2001 to transmit the job to the device 30 designated in the job. For example, when receiving the job from the user terminal 10, the job control unit 2002 registers the job in a queue to manage execution of the job.

Figure 13:
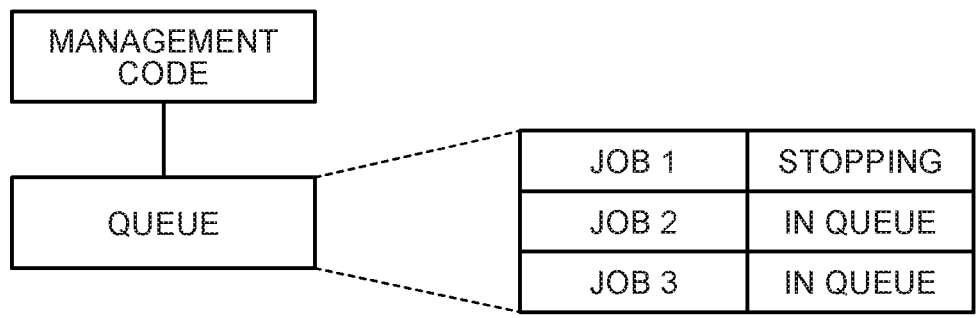
FIG. 13 is an explanatory diagram illustrating an example of a data configuration of a queue.

FIG. 13 is an explanatory diagram illustrating an example of a data configuration of the queue. As illustrated in FIG. 13, the job control unit 2002 manages the queue for each management code. The job control unit 2002 holds job information associated with the queue for each management code. In the queue illustrated in FIG. 13, a job 1, a job 2, and a job 3 are registered in this order. FIG. 13 illustrates that the job 1 is "stopping", the job 2 is "in the queue", and the job 3 is "in the queue".

The job control unit 2002 then acquires the job registered in the queue, and causes the communication control unit 2001 to transmit the job to the device 30 designated in the job. At this point, the job control unit 2002 extracts, from the management code table T2, the management code associated with the device code of the device 30 as a transmission destination to which the job has been transmitted by the communication control unit 2001. The job control unit 2002 stores the extracted management code in association with the execution history of the job. That is, the job control unit 2002 stores the extracted management code in association with the job type and the date and time of generation in the job management table T3.

When the device 30 is replaced, the job control unit 2002 acquires the management code associated with the device code of the device 30 after the replacement from the management code table T2. The job control unit 2002 extracts the queue associated with the acquired management code. The job control unit 2002 acquires the setting information associated with the device code of the device 30 after the replacement. The job control unit 2002 then causes the device 30 of the device code associated with the acquired management code to execute the job registered in the extracted queue with a setting of the acquired setting information. That is, the job control unit 2002 acquires the job information with reference to the management code table T2 using the management code associated with the device code, acquires the setting information with reference to the device management table T1, and then causes jobs that have not been executed in the queue of the job information to be successively executed.

The device management unit 2003 manages each device 30 in the device management system 1. The device management unit 2003 includes a device information management unit 2023 and a device state management unit 2013.

The device state management unit 2013 manages an installation state of the device 30 such as replacement or return of the device 30. The device state management unit 2013 includes an extracting unit 2113 and an acquisition unit 2213.

When receiving a request to replace the device including the device code, the extracting unit 2113 extracts, from the device management table T1, the device type code associated with the same device code as the device code included in the request to replace the device, and installation place information.

The acquisition unit 2213 transmits the extracted device type code and installation place information to the device ordering server 40, and acquires the installation planned device code as identification information for identifying the device 30 that is planned to be replaced. The installation planned device code is installation planned device-specific identification information indicating identification information specific to the device 30 that is planned to be replaced.

The device information management unit 2023 manages the device management table T1. That is, in the device management table T1, the device information management unit 2023 holds, in association with each device code indicating the identification information specific to corresponding one of a plurality of devices 30, the device type code indicating the device type of the device 30 and the installation place information indicating the installation place of the device 30.

When the device management system 1 is notified of an update request corresponding to installation of a new device 30, the device information management unit 2023 updates the device management table T1. More specifically, the device information management unit 2023 stores, in the device management table T1, the device type code indicating the device type of the device 30, the installation place information indicating the installation place of the device 30, the setting information indicating initial setting information of the device 30, and counter information indicating the number of pages executed by the device 30 in association with the device code included in the update request.

When the job control unit 2002 causes the job to be transmitted, the device information management unit 2023 increments the counter information of a function related to the job. When the setting of the device 30 is changed, the device information management unit 2023 changes the setting information related to the changed setting.

When the device 30 is replaced, the device information management unit 2023 receives the update request for the device management table T1 from the device mapping unit 2004. The update request corresponding to the replacement of the device 30 includes the device code of the device 30 before the replacement and the device code of the device 30 after the replacement. The device information management unit 2023 updates the device code of the device 30 before the replacement with the device code of the device 30 after the replacement in the device management table T1. Thus, the device information management unit 2023 can cause the device 30 after the replacement to take over the counter information and the setting information before the device 30 is replaced. That is, the device information management unit 2023 updates the counter information of the device management table T1 every time the job is executed, and replaces the device code associated with the management code table T2 with the installation planned device code to updates the device management table T1, thereby taking over the counter information of the device code as the counter information of the installation planned device code. The device information management unit 2023 replaces the device code associated with the management code with the installation planned device code to updates the device management table T1, thereby taking over the setting information of the device code as the setting information of the installation planned device code.

When receiving a notification of changing each item in the device management table T1 from the user terminal 10 or the device 30, the device information management unit 2023 updates the changed item.

The device mapping unit 2004 manages the management code table T2. That is, in the management code table T2, the device mapping unit 2004 holds the device state indicating the installation state or the operating state of the device 30, the device code, and the installation planned device code in association with each management code. The device mapping unit 2004 includes a determining unit 2014 and an update unit 2024.

When receiving a device installation notification indicating that the device 30 is installed, the determining unit 2014 determines whether a new device 30 is installed or the device 30 is replaced. More specifically, when receiving an installation request for the device 30 including the installation planned device code, the determining unit 2014 determines whether there is a management code held in association with the installation planned device code included in the installation request in management codes held by the device mapping unit 2004 in the management code table T2. If the installation planned device code included in the installation request is not held in association with the management code held in the management code table T2, the determining unit 2014 determines that a new device 30 is installed. If the installation planned device code included in the installation request is held in association with the management code held in the management code table T2, the determining unit 2014 determines that the device 30 is replaced.

When the determining unit 2014 determines that a new device 30 is installed, the update unit 2024 updates the management code table T2. More specifically, the update unit 2024 newly provides a management code. The update unit 2024 sets the device state corresponding to the state of the installed device 30. The update unit 2024 stores the device code included in the device installation notification as the installation device code. The update unit 2024 notifies the device information management unit 2023 of the update request for requesting to update the device management table T1. More specifically, the update unit 2024 notifies the device information management unit 2023 of the update request including the device code included in the device installation notification, and request to add various pieces of information of the newly installed device 30.

When the device 30 is replaced with another device 30, the update unit 2024 stores the management code related to the device 30 to be replaced in association with the device code of the device 30 after the replacement in the management code table T2 as a preparation to replace the device 30. Specifically, the update unit 2024 stores the device state associated with the management code related to the device 30 to be replaced as a preparation to replace the device 30, and stores the device state of "being replaced". The update unit 2024 stores the device code of the device 30 after the replacement as the installation planned device code associated with the management code related to the device 30 to be replaced.

When the determining unit 2014 determines that the device 30 is replaced, and the operating state specified by the device state is "being replaced", the update unit 2024 updates the management code table T2. More specifically, when the device 30 is completely replaced with another device 30, the update unit 2024 stores the device state of the device 30 before the replacement. That is, when the device state before being set to "being replaced" is "operating", the update unit 2024 updates the device state from "being replaced" to "operating". When the device state before being set to "being replaced" is "not operating", the update unit 2024 updates the device state from "being replaced" to "not operating". Further, to update unit 2024 replaces the device code held in association with the management code with the installation planned device code and then eliminates the installation planned device code, to replace the device code associated with the management code with the installation planned device code.

When the device 30 is removed, the update unit 2024 stores "not installed" as the device state associated with the management code related to the removed device 30. The update unit 2024 causes the installation device code associated with the management code related to the device 30 to be "-" to explicitly indicate that the device 30 is not installed.

The installation history control unit 2005 manages the installation history table T4. For example, when the configuration of the device 30 included in the device management system 1 is changed, the installation history control unit 2005 stores change content and the like that have been performed, in the installation history table T4. When the device 30 is newly installed in the device management system 1, the installation history control unit 2005 stores the execution content, the device code, the date and time of execution, and the execution state in the installation history table T4 in association with the management code. When the new device 30 is completely installed, the installation history control unit 2005 stores "completed" as the execution state of a corresponding management code. When the device 30 is replaced, the installation history control unit 2005 stores the device code of the device 30 as a replacement destination and "replaced" as the execution content in the installation history table T4.

The report generation unit 2006 generates the report R1 (refer to FIG. 14) indicating the use state of one or a plurality of devices 30 associated with the management code, based on the execution history of the job stored in the job management table T3. For example, when a generation request for the report R1 indicating the use state of the device 30 associated with the management code is input by designating the management code, the report generation unit 2006 determines whether the designated management code is present in the management code table T2. When the designated management code is present in the management code table T2, the report generation unit 2006 extracts the installation history associated with the designated management code from the installation history table T4. The report generation unit 2006 extracts the job associated with the designated management code from the job management table T3. The report generation unit 2006 determines whether the device 30 associated with the management code is replaced. If the device 30 is replaced, the report generation unit 2006 generates the report R1 indicating the use state of each device 30. On the other hand, if the device 30 is not replaced, the report generation unit 2006 generates the report R1 indicating the use state as it is.

Figure 14:
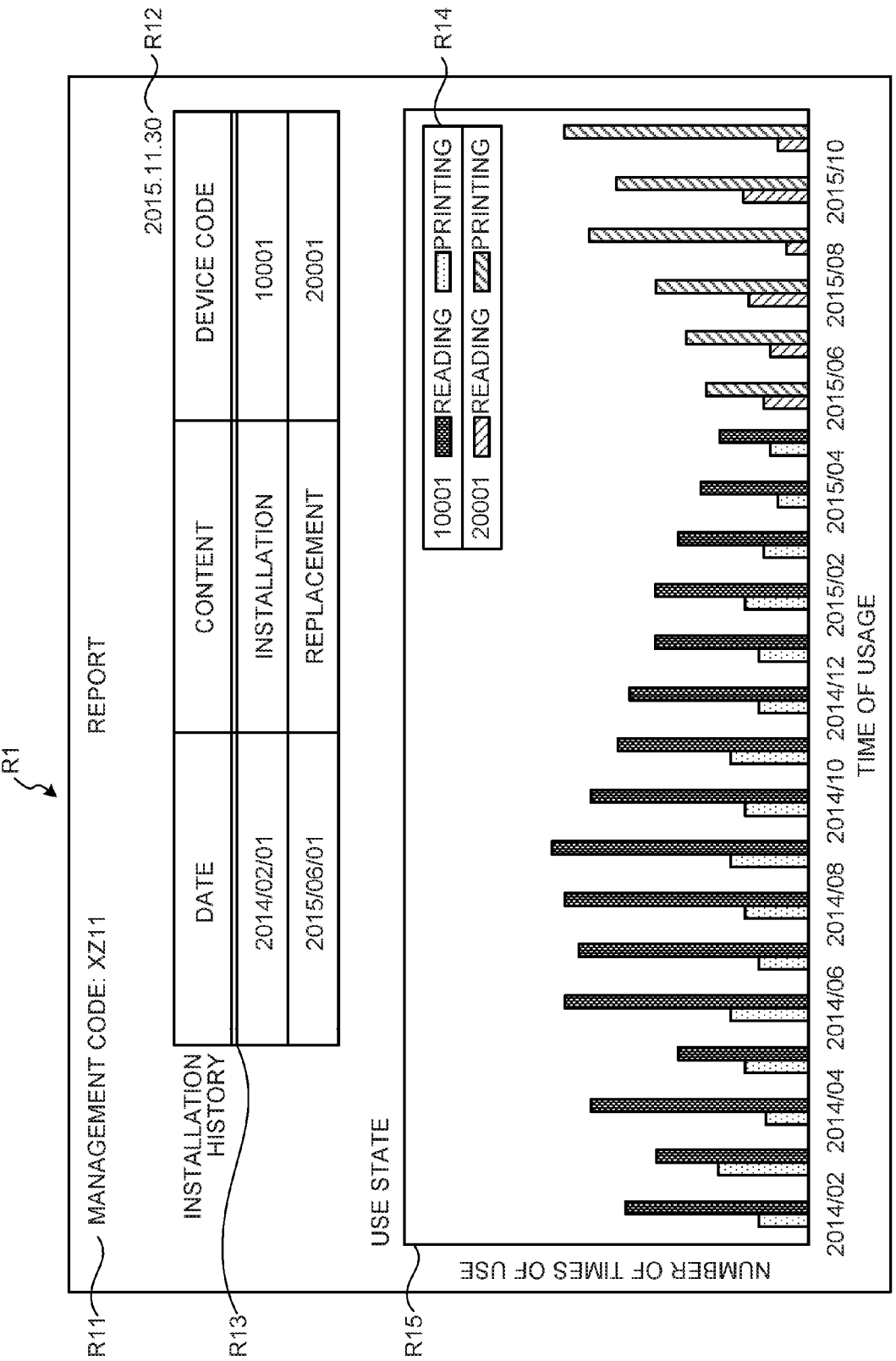
FIG. 14 is an explanatory diagram illustrating an example of a report.

FIG. 14 is an explanatory diagram illustrating an example of the report R1. The report R1 includes a target management code R11, date and time of generation R12, an installation history R13, a use state expression method R14, and a use state R15. The target management code R11 indicates the management code as a target of the report R1. The date and time of generation R12 indicates the date and time on which the report R1 is generated. The installation history R13 indicates a history of the device 30 associated with the management code as the target of the report R1. More specifically, the installation history R13 indicates the date on which the device 30 is installed, installed content, and the device code of the installed device 30. The use state expression method R14 indicates an expression method for each function of each device 30 associated with the management code in the use state R15.

The use state R15 indicates, using a graph, the use state of each device 30 in an aspect that can be intuitively identified. The use state R15 indicates the use state of each device 30 per predetermined period. The use state R15 indicates the use state for each function of one or a plurality of devices 30 associated with the management code. When the device 30 associated with the management code is replaced, the use state R15 indicates the use state of each device 30 in an aspect in which a replaced timing can be identified. Additionally, in the use state R15, the use state in the predetermined period before the device 30 is replaced can be compared with the use state in the predetermined period after the device 30 is replaced.

In the use state R15 illustrated in FIG. 14, each bar in a bar graph indicates the use state of each device 30 for one month. In the use state R15 illustrated in FIG. 14, the bar in the bar graph is expressed with a different pattern for each device 30. In the use state R15 illustrated in FIG. 14, used is the bar of a different pattern for each function of each device 30. Accordingly, the user can easily grasp the timing when the device 30 is replaced. That is, in the use state R15 illustrated in FIG. 14, the use state in the predetermined period before the device 30 is replaced can be compared with the use state in the predetermined period after the device 30 is replaced. The use state R15 illustrated in FIG. 14 represents the use state for one month. However, this is merely an example, and another period may be employed. The use state R15 illustrated in FIG. 14 is expressed with the bar of a different pattern for each device 30 or for each function. Alternatively, the use state R15 may be expressed with another form such as different colors. The use state R15 illustrated in FIG. 14 is expressed using the bar graph. Alternatively, the use state R15 may be expressed using a graph of another form, or expressed in a form other than the graph, that is, a table and the like.

The display control unit 2007 controls the display unit 205 to display various screens. For example, the display control unit 2007 causes a Web screen to be displayed. The Web screen receives a request to replace the device for replacing the device 30, a request to return the device for returning the device 30, a change of the installation place information of the device 30, and a change of device correspondence information.

Figure 15:
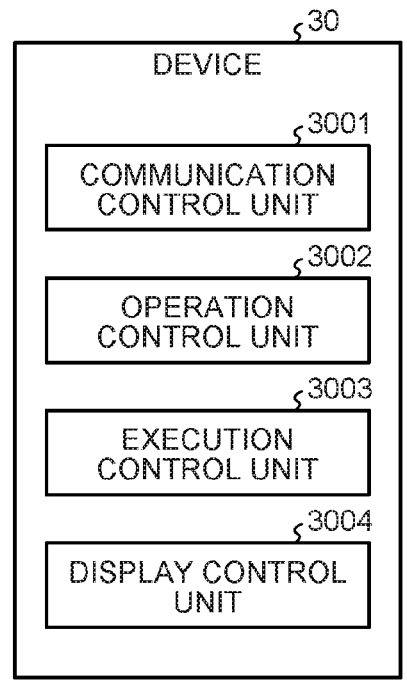
FIG. 15 is a block diagram illustrating an example of a functional block representing a characteristic functional configuration of the device according to the embodiment.

FIG. 15 is a block diagram illustrating an example of a functional block representing a characteristic functional configuration of the device 30 according to the embodiment. For convenience, FIG. 15 mainly exemplifies functions related to the embodiment. However, functions of the device 30 are not limited thereto.

The CPU 301 of the device 30 executes the control program PR3 and the like stored in the storage unit 307 to implement various functions. Specifically, the CPU 301 implements a communication control unit 3001, an operation control unit 3002, an execution control unit 3003, and a display control unit 3004.

The communication control unit 3001 controls the communication interface 304 to control communication via the network 50.

The operation control unit 3002 controls the display operation unit 305 to receive various operations. For example, the operation control unit 3002 receives an operation for executing a function of the device 30.

The execution control unit 3003 executes various functions of the device 30. For example, when the communication control unit 3001 receives a job for requesting to execute the various functions, the execution control unit 3003 executes the job related to a designated function. Alternatively, when the operation control unit 3002 receives an operation for requesting to execute the various functions, the execution control unit 3003 executes the job related to an operated function. Specifically, the execution control unit 3003 executes a job related to a scanning function for reading a document, or a job related to a printing function for printing a document. When the function is completely executed, the execution control unit 3003 causes the communication control unit 3001 to transmit the fact that the job is completely executed to the server apparatus 20.

The display control unit 3004 controls the display operation unit 305 to display various screens. For example, the display control unit 3004 causes a user interface (UI) screen to be displayed for receiving various operations on the device 30.

Figure 16:
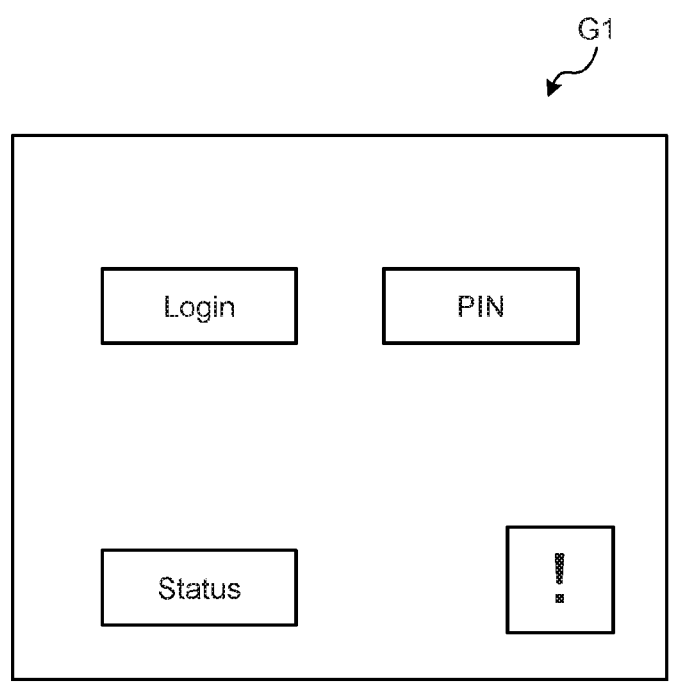
FIG. 16 is an explanatory diagram illustrating an example of a UI screen.

FIG. 16 is an explanatory diagram illustrating an example of a UI screen G1. The UI screen G1 illustrated in FIG. 16 displays icons of "Login", "PIN", "Status", and "!". "Login" is an icon for performing user authentication and selecting a function for executing the job of the user. "PIN" is a PIN code (a one-shot ID allocated for each job), that is, an icon for selecting a function for executing the job. "!" is an icon that is lit in red when an error is caused in the device 30. The icon of "!" can be pushed irrespective of a lighting state. When "!" is pushed, the state of the device 30 is displayed. "Status" is an icon for selecting a function for checking information of the device 30. When "Status" is pushed, displayed is an device information screen indicating various pieces of information of the device 30 stored in the server apparatus 20.

Figure 17:
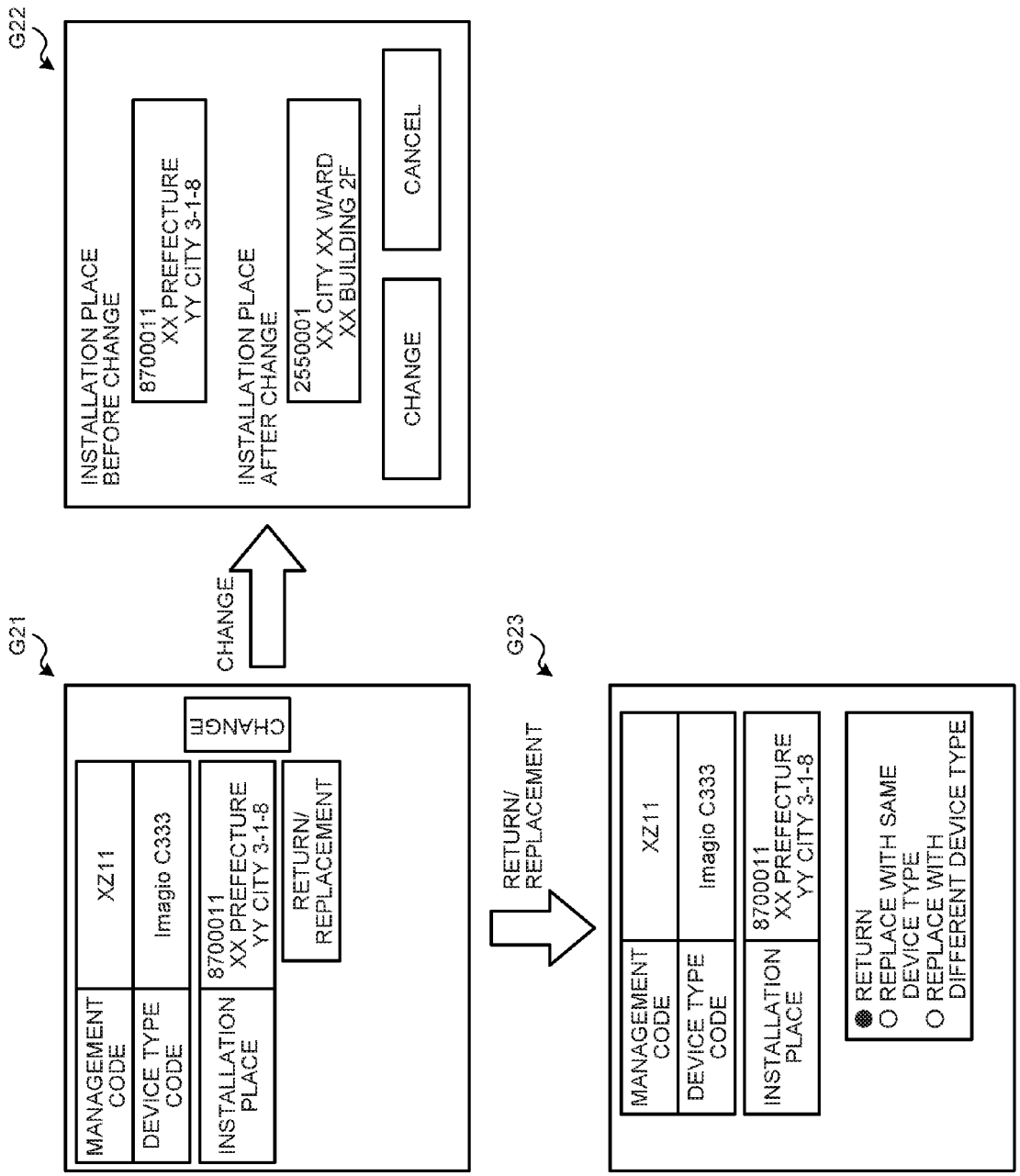
FIG. 17 is an explanatory diagram illustrating an example of screen transition of a device information screen.

FIG. 17 is an explanatory diagram illustrating an example of screen transition of a device information screen G21. The device information screen G21 is a screen displaying various pieces of information of the device 30 stored in the server apparatus 20. That is, the device information screen G21 is a screen displaying various pieces of information stored in the device management table T1 and the management code table T2. The device information screen G21, a change screen G22, and a selection screen G23 illustrated in FIG. 17 are Web screens generated by the display control unit 2007 of the server apparatus 20. To display the Web screen, the display control unit 3004 uses software such as a browser. The device information screen G21 illustrated in FIG. 17 displays the management code "XZ11", the device type code "Imagio C333", and the installation place information "8700011 XX prefecture YY city 3-1-8". The device information screen G21 displays icons of "change" and "return/replacement".

When the icon of "change" is selected, the display control unit 3004 makes a transition to the change screen G22 for changing the installation place information. The change screen G22 displays the installation place information in the device management table T1 as the installation place before the change. The change screen G22 includes an input box for receiving an input of the installation place after the change. The change screen G22 also displays icons of "change" and "cancel". "change" is an icon for changing the installation place information in the device management table T1 into the installation place after the change in the input box. That is, "change" is an icon for updating a changed item in the items in the device management table T1. "cancel" is an icon for canceling the change of the installation place information.

When the icon of "return/replacement" is selected, the display control unit 3004 makes a transition to the selection screen G23 for selecting replacement or return of the device 30. The selection screen G23 displays operators of "return", "replace with same device type", and "replace with different device type". "return" is an operator for registering return of the device 30. "replace with same device type" is an operator for registering replacement of the device 30 with a different device 30 of the same device type. "replace with different device type" is an operator for registering replacement of the device 30 with a different device 30 of a different device type.

Figure 18:
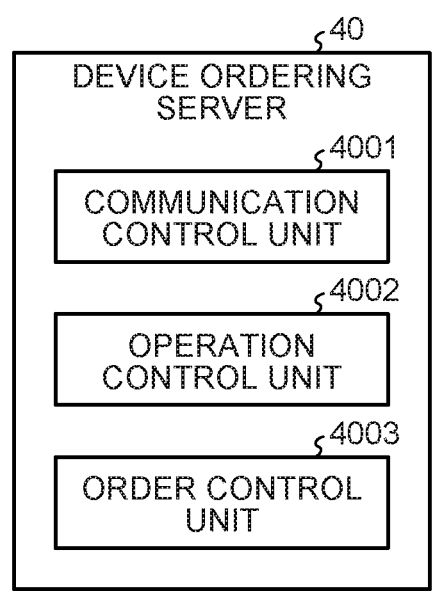
FIG. 18 is a block diagram illustrating an example of a functional block representing a characteristic functional configuration of the device ordering server according to the embodiment.

FIG. 18 is a block diagram illustrating an example of a functional block representing a characteristic functional configuration of the device ordering server 40 according to the embodiment. For convenience, FIG. 18 mainly exemplifies functions related to the embodiment. However, functions of the device ordering server 40 are not limited thereto.

The CPU 401 of the device ordering server 40 executes the control program PR4 and the like stored in the storage unit 407 to implement various functions. Specifically, the CPU 401 implements a communication control unit 4001, an operation control unit 4002, and an order control unit 4003.

The communication control unit 4001 controls the communication interface 404 to control communication via the network 50.

The operation control unit 4002 controls the operation unit 406 to receive various operations.

When the communication control unit 4001 and the like receive an order for the device 30 the device type and the like of which are designated, the order control unit 4003 acquires the device code of the device 30 having a corresponding device type code. The order control unit 4003 may acquire the device code from a database and the like prepared in advance, or request an administrator and the like of the device ordering server 40 to input the device code to acquire the device code. The order control unit 4003 then causes the communication control unit 4001 to transmit the acquired device code to the ordering source.

Processing of Replacing Device

Next, the following describes processing of replacing the device 30 in the device management system 1.

Figure 19:
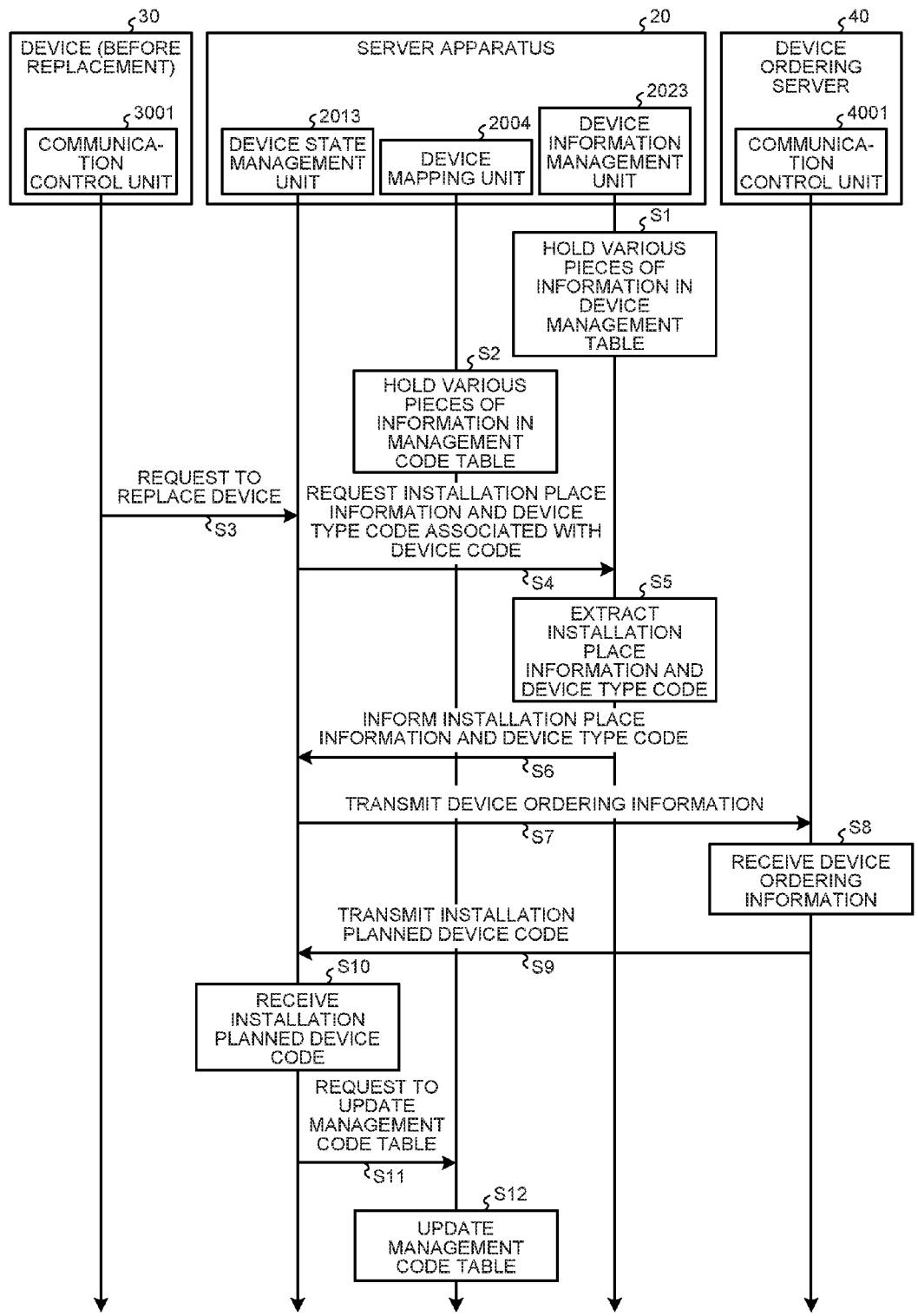
FIG. 19 is a sequence diagram illustrating an example of replacement registration processing.

FIG. 19 is a sequence diagram illustrating an example of replacement registration processing performed by each apparatus in the device management system 1 according to the embodiment. The replacement registration processing is processing of registering replacement of the device 30 in the device management system 1.

The device information management unit 2023 of the server apparatus 20 holds various pieces of information in the device management table T1 (Step S1). The device mapping unit 2004 of the server apparatus 20 holds various pieces of information in the management code table T2 (Step S2).

When receiving an operation for replacing the device 30 from the user, the communication control unit 3001 of the device 30 transmits a request to replace the device including the device code of the device 30 itself (Step S3).

The device state management unit 2013 of the server apparatus 20 requests the installation place information and the device type code associated with the device code included in the received request to replace the device (Step S4). The device information management unit 2023 extracts, from the device management table T1, the requested installation place information and the device type code associated with the device code (Step S5). The device information management unit 2023 informs the extracted installation place information and the device type code (Step S6).

The device state management unit 2013 of the server apparatus 20 transmits device ordering information to the device ordering server 40 (Step S7). The device ordering information is information for requesting the device 30 after the replacement including the installation place information and the device type code. The communication control unit 4001 of the device ordering server 40 receives the device ordering information (Step S8). The communication control unit 4001 transmits the installation planned device code indicating a new device 30 after the replacement (Step S9). At Step S7, the server apparatus 20 may transmit the device ordering information by e-mail and the like. At Step S9, the device ordering server 40 may transmit the installation planned device code indicating a new device 30 after the replacement by e-mail and the like to an administrator and the like of the device 30.

The device state management unit 2013 acquires the installation planned device code received by the communication control unit 2001 (Step S10). The device state management unit 2013 informs the device code indicating the device 30 as a replacement target and the installation planned device code to request to update the management code table T2 (Step S11).

The device mapping unit 2004 updates the management code table T2 (Step S12). The device mapping unit 2004 causes the device state associated with the same device code as the device code of the update request to be "being replaced". The device mapping unit 2004 registers the installation planned device code of the update request to the installation planned device code associated with the same device code as the device code of the update request.

The replacement registration processing performed by each apparatus in the device management system 1 is thus ended.

Figure 20:
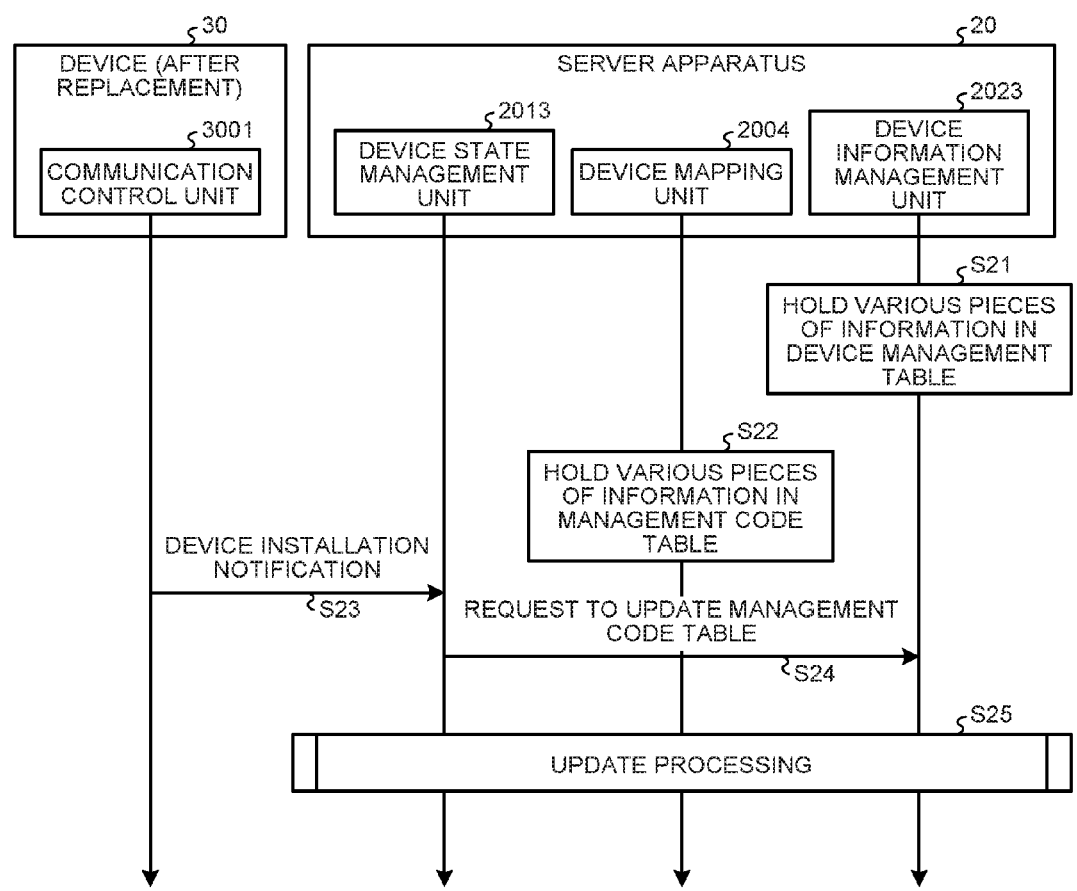
FIG. 20 is a sequence diagram illustrating an example of update request processing.

FIG. 20 is a sequence diagram illustrating an example of update request processing performed by each apparatus in the device management system 1 according to the embodiment. The update request processing is processing of requesting to update a setting and the like for the device 30 due to the replacement of the device 30 in the device management system 1.

The device information management unit 2023 of the server apparatus 20 holds various pieces of information in the device management table T1 (Step S21). The device mapping unit 2004 of the server apparatus 20 holds various pieces of information in the management code table T2 (Step S22).

When receiving an operation indicating that the device 30 itself is installed from the user, the communication control unit 3001 of the device 30 transmits the device installation notification including the device code of the device 30 itself (Step S23). In other words, the communication control unit 3001 transmits the device installation notification including installation planned device-specific code indicating the device 30 itself.

The device state management unit 2013 of the server apparatus 20 informs an update request for requesting to update the management code table T2 including the device code included in the received device installation notification (Step S24).

The server apparatus 20 performs update processing described later (Step S25).

The update request processing performed by each apparatus in the device management system 1 is thus ended.

Figure 21:
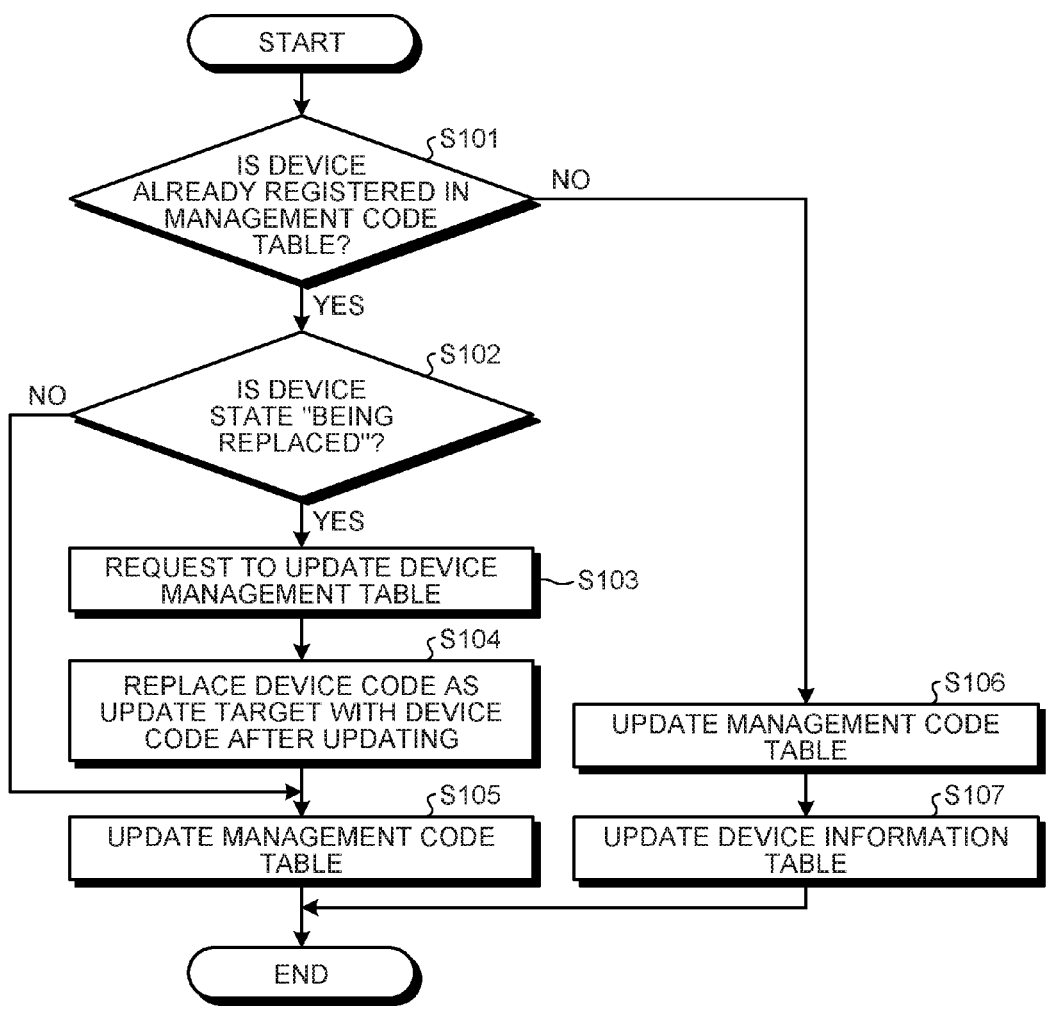
FIG. 21 is a flowchart illustrating an example of update processing.

FIG. 21 is a flowchart illustrating an example of update processing performed by the server apparatus 20 according to the embodiment. The update processing is processing of updating a setting and the like of the device 30 due to the replacement of the device 30.

The device mapping unit 2004 determines whether the device 30 of the device code included in the device installation notification is already installed (Step S101). More specifically, the device mapping unit 2004 determines whether the same device code as the device code included in the device installation notification is registered in the management code table T2. The device mapping unit 2004 also determines whether the management code associated with the same device code as the device code included in the device installation notification is registered in the management code table T2.

If the corresponding management code is registered (Yes at Step S101), the device mapping unit 2004 determines whether the device state associated with the management code is "being replaced" (Step S102). If the device state is not "being replaced" (No at Step S102), the device mapping unit 2004 advances the process to Step S105.

On the other hand, if the device state is "being replaced" (Yes at Step S102), the device mapping unit 2004 requests to update the device management table T1 (Step S103). That is, the device mapping unit 2004 notifies the device information management unit 2023 of an update request including the device code as an update target and the device code after updating. The device code as an update target is the device code stored as the installation device code in the management code table T2. The device code after updating is a device code stored as the installation planned device code in the management code table T2.

The device information management unit 2023 replaces the device code as an update target with the device code after updating in the device management table T1 (Step S104).

The device mapping unit 2004 updates the management code table T2 (Step S105). More specifically, the device mapping unit 2004 extracts, from the management code table T2, the management code associated with the same installation planned device code as the device code included in the update request. The device mapping unit 2004 updates various pieces of information associated with the extracted management code in the management code table T2. More specifically, the device mapping unit 2004 stores the device code stored as the installation planned device code as the installation device code. The device mapping unit 2004 eliminates the installation planned device code. The device mapping unit 2004 updates the device state from "being replaced" to "operating".

Returning to Step S101, if the management code is not registered (No at Step S101), the device mapping unit 2004 updates the management code table T2 (Step S106). More specifically, the device mapping unit 2004 provides a new management code. The device mapping unit 2004 associates the new management code and the device code included in the device installation notification. The device mapping unit 2004 sets the device state to be "operating".

The device mapping unit 2004 causes the device information management unit 2023 to update the device management table T1 (Step S107). More specifically, the device mapping unit 2004 notifies the device information management unit 2023 of the update request including the device code included in the device installation notification. The device information management unit 2023 stores the device code included in the update request in the device management table T1. The device information management unit 2023 stores the installation place information, the device type code, the counter information, and the setting information of the device 30 indicated by the device code in association with the device code.

The update processing performed by the server apparatus 20 is thus ended.

Figure 22:
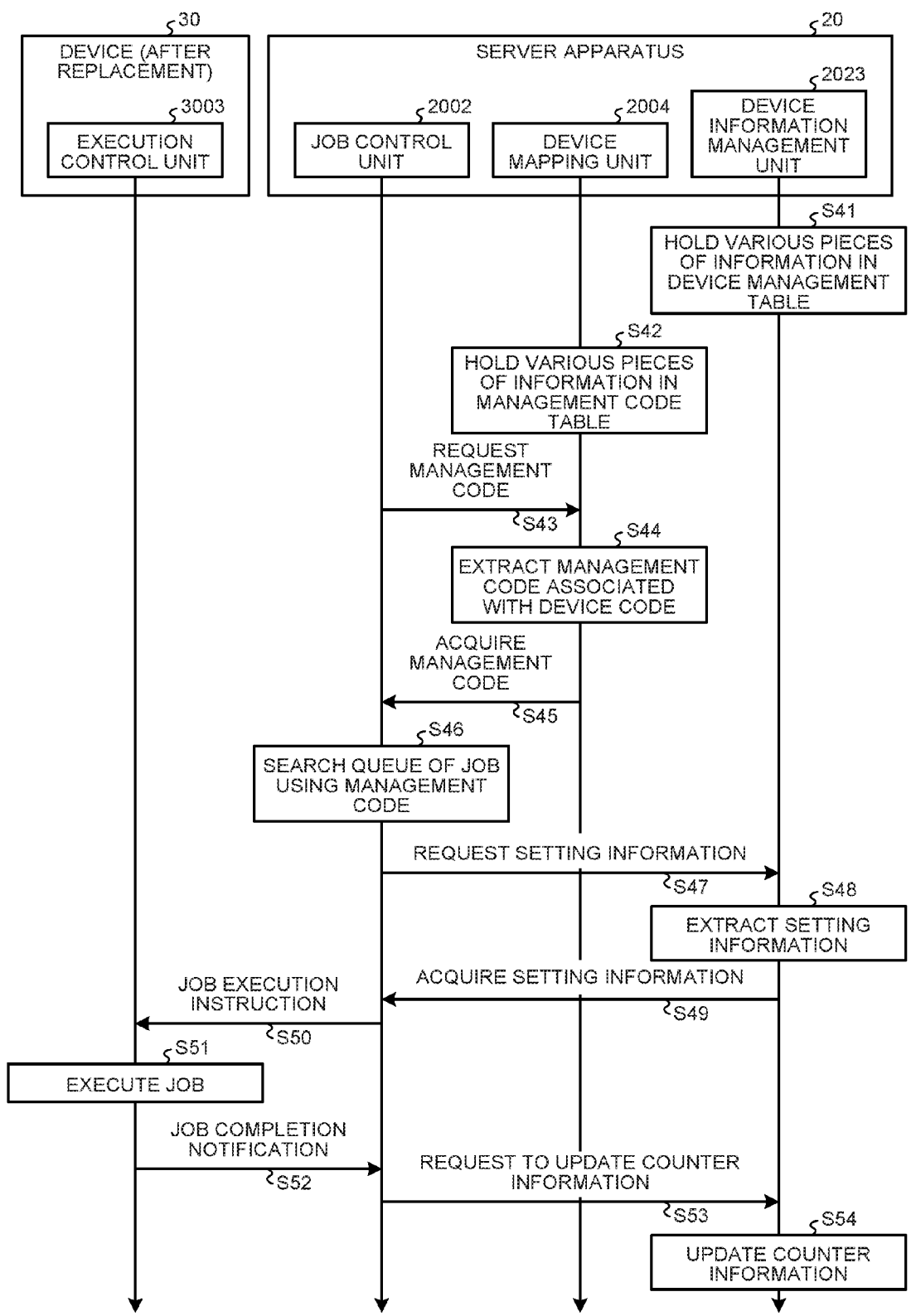
FIG. 22 is a sequence diagram illustrating an example of job execution processing.

FIG. 22 is a sequence diagram illustrating an example of job execution processing performed by each apparatus in the device management system 1 according to the embodiment. The job execution processing is processing of causing the device 30 after the replacement to execute the job in the device management system 1.

The device information management unit 2023 of the server apparatus 20 holds various pieces of information in the device management table T1 (Step S41). The device mapping unit 2004 of the server apparatus 20 holds various pieces of information in the management code table T2 (Step S42).

Next, the job control unit 2002 informs the device code of the device 30 after the replacement, and requests the management code associated with the device code (Step S43). The job control unit 2002 extracts the management code associated with the informed device code from the management code table T2 (Step S44). The job control unit 2002 acquires the management code extracted by the device mapping unit 2004 (Step S45).

The job control unit 2002 acquires the job from the queue associated with the acquired management code (Step S46).

The job control unit 2002 requests the setting information and the like associated with the device code of the device 30 after the replacement from the device information management unit 2023 (Step S47). The device information management unit 2023 extracts, from the device management table T1, the setting information and the like associated with the requested device code (Step S48). The job control unit 2002 acquires the setting information and the like extracted by the device information management unit 2023 (Step S49).

The job control unit 2002 causes the communication control unit 2001 to transmit a job execution instruction including the job acquired at Step S45 and the setting information acquired at Step S44 (Step S50).

The execution control unit 3003 of the device 30 executes the job instructed by the job control unit 2002 with a setting indicated by the setting information (Step S51). The execution control unit 3003 of the device 30 causes the communication control unit 3001 to transmit a job completion notification (Step S52).

When receiving the job completion notification, the job control unit 2002 designates a function of the executed job and informs the update request for the counter information (Step S53). When receiving the update request for the counter information, the device information management unit 2023 updates the counter information of the designated function (Step S54).

The job execution processing performed by each apparatus in the device management system 1 is thus ended.

Figure 23:
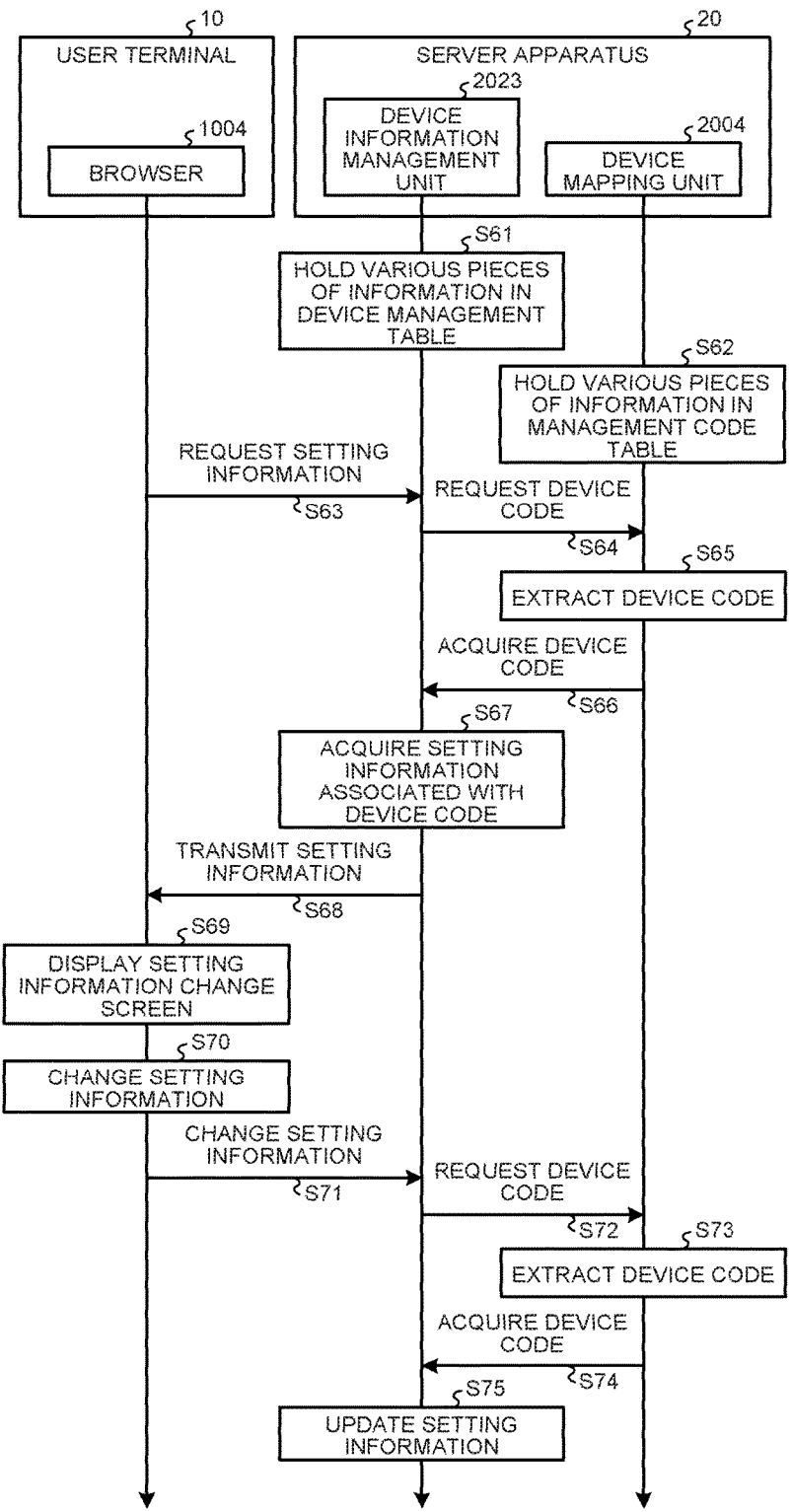
FIG. 23 is a sequence diagram illustrating an example of setting change processing.

FIG. 23 is a sequence diagram illustrating an example of setting change processing performed by each apparatus in the device management system 1 according to the embodiment. The setting change processing is processing of changing the setting information and the like of the device 30 through the user terminal 10.

First, the device information management unit 2023 of the server apparatus 20 holds various pieces of information in the device management table T1 (Step S61). The device mapping unit 2004 of the server apparatus 20 holds various pieces of information in the management code table T2 (Step S62).

When receiving an operation for displaying a setting information change screen for changing the setting information of the device 30, the browser 1004 of the user terminal 10 transmits a transmission request for the setting information of the device 30 associated with the management code designated in the operation (Step S63). More specifically, for example, when accessing a uniform resource locator (URL) for displaying a Web screen for changing the setting information, the browser 1004 transmits the transmission request for the setting information. The URL may be stored in the storage unit 107 and the like of the user terminal 10 in advance, or may be acquired from the server apparatus 20 and the like.

The device information management unit 2023 of the server apparatus 20 requests the device code associated with the designated management code from the device mapping unit 2004 (Step S64). The device mapping unit 2004 extracts the device code associated with the notified management code from the management code table T2 (Step S65). The device information management unit 2023 acquires the device code extracted by the device mapping unit 2004 (Step S66).

The device information management unit 2023 acquires the setting information associated with the acquired device code from the device management table T1 (Step S67). The device information management unit 2023 causes the communication control unit 2001 to transmit the acquired setting information (Step S68).

The browser 1004 of the user terminal 10 displays the setting information change screen including the notified setting information (Step S69). The browser 1004 receives a change of the setting information on the setting information change screen (Step S70). The browser 1004 transmits a change notification including change content of the setting information and the management code of the device 30 of the changed setting information (Step S71).

The device information management unit 2023 requests the device code associated with the management code included in the change notification from the device mapping unit 2004 (Step S72). The device mapping unit 2004 extracts the device code associated with the notified management code from the management code table T2 (Step S73). The device information management unit 2023 acquires the device code extracted by the device mapping unit 2004 (Step S74).

The device information management unit 2023 updates the setting information associated with the acquired device code in the device management table T1 (Step S75). That is, the device information management unit 2023 reflects the change content of the setting information included in the change notification on the setting information of the device management table T1.

The setting change processing performed by each apparatus in the device management system 1 is thus ended.

Processing of Generating Report

Next, the following describes report generation processing in which the server apparatus 20 generates a report indicating the use state of the device 30.

Figure 24:
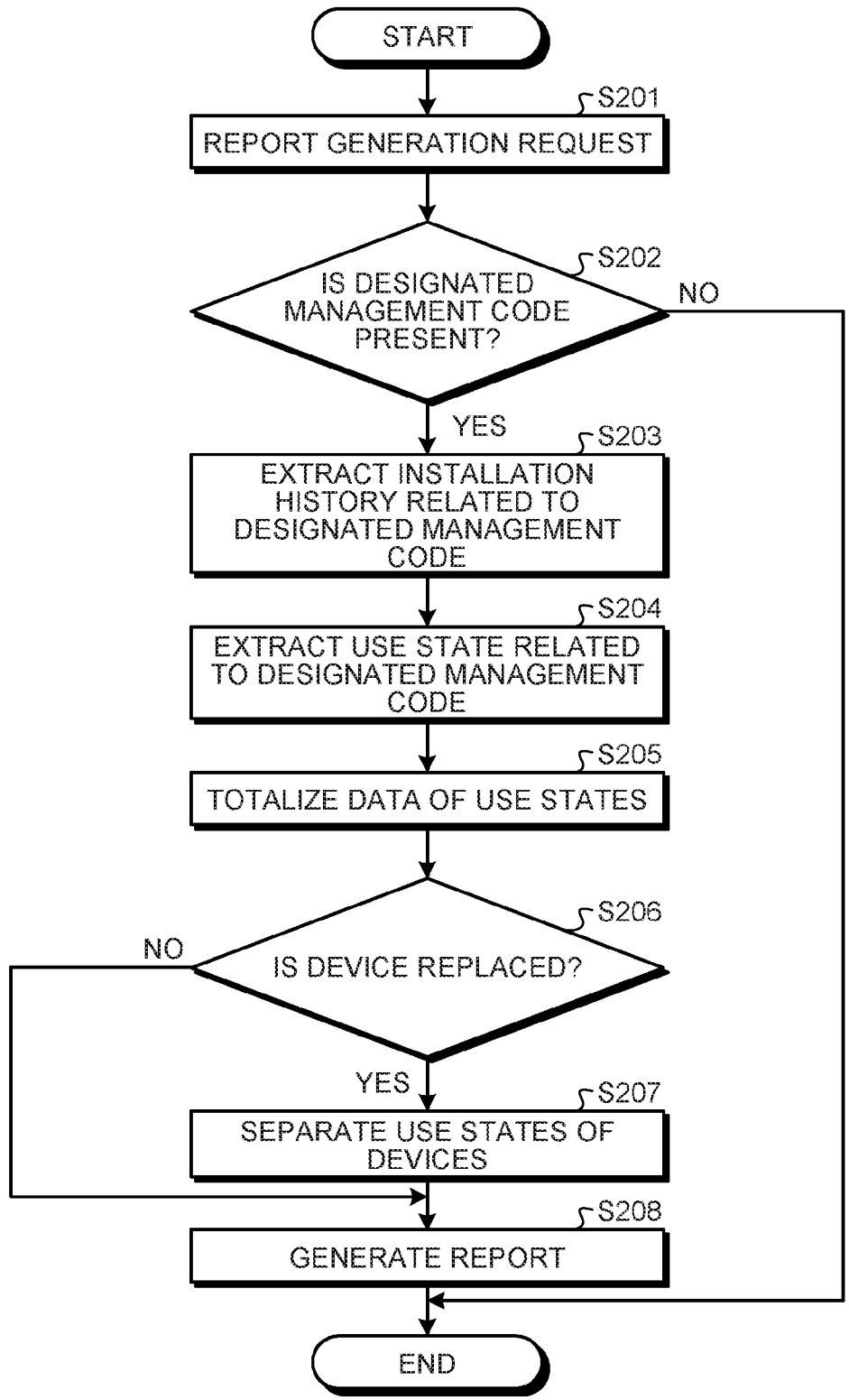
FIG. 24 is a flowchart illustrating an example of report generation processing.

FIG. 24 is a flowchart illustrating an example of the report generation processing performed by the server apparatus 20 according to the embodiment. The report generation processing is processing of generating the report indicating the use state of the device 30.

First, the report generation unit 2006 of the server apparatus 20 receives a report generation request (Step S201).

Next, the report generation unit 2006 of the server apparatus 20 determines whether the management code designated in the report generation request is present in the management code table T2 (Step S202). If the designated management code is not present in the management code table T2 (No at Step S202), the server apparatus 20 ends the report generation processing.

On the other hand, if the designated management code is present in the management code table T2 (Yes at Step S202), the report generation unit 2006 of the server apparatus 20 extracts the installation history of the device 30 associated with the management code from the installation history table T4 (Step S203).

Subsequently, the report generation unit 2006 of the server apparatus 20 extracts the use state related to the designated management code from the job management table T3 (Step S204). That is, the report generation unit 2006 extracts, from the job management table T3, the job type associated with the designated management code, the job state, and the date and time of generation.

The report generation unit 2006 of the server apparatus 20 then totalizes extracted use states (Step S205). That is, the report generation unit 2006 totalizes the use states for each job type. The report generation unit 2006 also compiles the use states for each predetermined period based on the date and time of generation.

Subsequently, the report generation unit 2006 of the server apparatus 20 determines whether the device 30 associated with the management code is replaced based on the installation history extracted from the installation history table T4 (Step S206).

If the device 30 is not replaced (No at Step S206), the server apparatus 20 advances the process to Step S208. If the device 30 is replaced (Yes at Step S206), the report generation unit 2006 of the server apparatus 20 separates the use states of replaced devices 30 (Step S207).

The report generation unit 2006 of the server apparatus 20 then generates the report indicating the use state (Step S208).

The report generation processing performed by the server apparatus 20 is thus ended.

Some embodiments of the present invention have been described above. However, the present invention is not limited to the embodiments described above. The present invention can be embodied by modifying components without departing from the gist of the invention at a practical phase. Various inventions can be made by combining a plurality of components disclosed in the embodiments described above as appropriate. For example, some of all components described in the embodiments may be eliminated. Components in different embodiments may be combined as appropriate.

The functions of the units (the communication control unit 1001, the operation control unit 1002, the display control unit 1003, and the browser 1004) of the user terminal 10 described above are implemented when the CPU 101 executes the control program PR1 and the like stored in a storage apparatus (for example, the ROM 102 or the storage unit 107). However, the embodiments are not limited thereto. For example, at least part of the functions of the units of the user terminal 10 may be implemented with a dedicated hardware circuit (for example, a semiconductor integrated circuit).

The functions of the units (the communication control unit 2001, the job control unit 2002, the device management unit 2003, the device state management unit 2013, the device information management unit 2023, the device mapping unit 2004, the installation history control unit 2005, the report generation unit 2006, and the display control unit 2007) of the server apparatus 20 described above are implemented when the CPU 201 executes the control program PR2 and the like stored in a storage apparatus (for example, the ROM 202 or the storage unit 207). However, the embodiments are not limited thereto. For example, at least part of the functions of the units of the server apparatus 20 may be implemented with a dedicated hardware circuit (for example, a semiconductor integrated circuit).

The functions of the units (the communication control unit 3001, the operation control unit 3002, the execution control unit 3003, and the display control unit 3004) of the device 30 described above are implemented when the CPU 301 executes the control program PR3 and the like stored in a storage apparatus (for example, the ROM 302 or the storage unit 307). However, the embodiments are not limited thereto. For example, at least part of the functions of the units of the device 30 may be implemented with a dedicated hardware circuit (for example, a semiconductor integrated circuit).

The functions of the units (the communication control unit 4001, the operation control unit 4002, and the order control unit 4003) of the device ordering server 40 described above are implemented when the CPU 401 executes the control program PR4 and the like stored in a storage apparatus (for example, the ROM 402 or the storage unit 407). However, the embodiments are not limited thereto. For example, at least part of the functions of the units of the device ordering server 40 may be implemented with a dedicated hardware circuit (for example, a semiconductor integrated circuit).

The computer program executed by each apparatus according to the embodiments described above is embedded and provided in a storage medium (a ROM or a storage unit) included in each apparatus. However, the embodiments are not limited thereto. For example, the computer program may be recorded and provided in a computer-readable recording medium such as a compact disc read only memory (CD-ROM), a flexible disk (FD), a compact disc recordable (CD-R), and a digital versatile disc (DVD), as an installable or executable file. The storage medium is not limited to a medium independent of a computer or an embedded system, and includes a storage medium that downloads and stores or temporarily stores therein a computer program transmitted via a LAN, the Internet, and the like.

The computer program executed by each apparatus according to the embodiments described above may be stored in a computer connected to a network such as the Internet and downloaded via the network to provide the computer program, or may be provided or distributed via a network such as the Internet. The computer program of each apparatus according to the embodiment may be embedded and provided in a ROM, for example.

According to an embodiment, various pieces of information can be easily taken over in replacing a device.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A device management system comprising one or more computers and configured to manage a plurality of devices connected to each other via a network, the device management system comprising:

a device information management unit configured to hold, in association with each piece of device-specific identification information indicating identification information specific to corresponding one of the plurality of devices, device type information indicating a device type of the device and installation place information indicating an installation place of the device;

an extracting unit configured to, in response to receiving a replacement request for a device, which includes device-specific identification information, extract device type information and installation place information held in association with the device-specific identification information included in the replacement request;

an acquisition unit configured to transmit the extracted device type information and the extracted installation place information to an external apparatus, and acquire installation planned device-specific identification information indicating identification information specific to a device that is planned to be replaced with the former device, from the external apparatus;

a device mapping unit configured to hold, in association with each piece of device management identification information indicating identification information for managing corresponding one of the plurality of devices, a device state indicating an installation state or an operating state of the device, device-specific identification information, and installation planned device-specific identification information;

a determining unit configured to, in response to receiving an installation request for a device, which includes device-specific identification information, determine whether there is device management identification information held in association with installation planned device-specific identification information identical to the device-specific identification information included in the installation request, in the device management identification information held by the device mapping unit; and an update unit configured to, if the determining unit determines that there is the device management identification information held in association, and an operating state that is specified by a device state held in association with the device management identification information is "being replaced", update the device state from "being replaced" to "operating", replace the device-specific identification information held in association with the device management identification information with the installation planned device-specific identification information and then eliminate the installation planned device-specific identification information to thereby replace the device-specific identification information associated with the device management identification information with the installation planned device-specific identification information.

2. The device management system according to claim 1, wherein the update unit is configured to, if the determining unit determines that there is the device management identification information held in association, and an operating state specified by a device state held in association with the device management identification information is "not operating", update the device state from "being replaced" to "not operating", replace the device-specific identification information held in association with the device management identification information with the installation planned device-specific identification information and then eliminate the installation planned device-specific identification information, for updating.

3. The device management system according to claim 1, wherein the device mapping unit is configured to provide new device management identification information and generate device state correspondence information in which the device-specific identification information is associated with the device management identification information, for updating, and the device information management unit is configured to generate device correspondence information in which device type information indicating a device type of the device, installation place information indicating an installation place of the device, setting information indicating initial setting information of the device, and counter information indicating a number of pages executed by the device are associated with the device-specific identification information, for updating, if the determining unit determines that the device management identification information held in association is not present.

4. The device management system according to claim 1, further comprising:
a job control unit configured to receive a job including device management identification information, register the job in a queue, and controls execution of the job, wherein
the job control unit is configured to hold job information associated with the queue for each piece of device management identification information,
the device information management unit is configured to update device correspondence information after device state correspondence information of the device mapping unit is updated, and
the job control unit is configured to acquire the job information using the device management identification information associated with the device-specific identification information with reference to the device state correspondence information, acquire setting information with reference to the device correspondence information, and then cause one or more jobs that are not executed in the queue of the job information, to be successively executed.

5. The device management system according to claim 1, wherein
the device information management unit is configured to hold device correspondence information in which counter information indicating a number of pages executed by the device is further associated with each piece of device-specific identification information, and
the device information management unit is configured to update the counter information of the device correspondence information every time a job is executed, and replace the device-specific identification information associated with the device management identification information with the installation planned device-specific identification information to updates the device correspondence information, thereby taking over the counter information of the device-specific identification information as counter information of the installation planned device-specific identification information.

6. The device management system according to claim 1, wherein
the device information management unit is configured to hold device correspondence information in which each piece of device-specific identification information is further associated with setting information indicating initial setting information of corresponding one of the devices, and
the device information management unit is configured to replace the device-specific identification information associated with the device management identification information with the installation planned device-specific identification information to update the device correspondence information, thereby taking over the setting information of the device-specific identification information as setting information of the installation planned device-specific identification information.

7. The device management system according to claim 1, further comprising a display control unit configured to display a Web screen for receiving a request to replace a device, a request to return a device, a change of the installation place information, and a change of the device correspondence information.

8. The device management system according to claim 7, wherein
the plurality of devices each comprise a browser configured to display the Web screen for receiving the change of the device correspondence information held by the device information management unit, and
the device information management unit is configured to update a changed item of the device correspondence information received on the Web screen displayed by the browser.

9. The device management system according to claim 7, further comprising an information processing apparatus configured to communicate with a server apparatus via the network, wherein
the information processing apparatus comprises a browser configured to display the Web screen for receiving the change of the device correspondence information held by the device information management unit, and
the device information management unit is configured to update a changed item of the device correspondence information received on the Web screen displayed by the browser.

10. The device management system according to claim 1, further comprising:
an operation control unit configured to receive an operation for executing a job related to a predetermined function of a device;
a job control unit configured to store, in a storage unit storing device management identification information in association with device-specific identification information for identifying the device, an execution history of the job received by the operation control unit in association with the device management identification information; and
a report generation unit configured to generate a report indicating use states of a first device before the first device is replaced and a second device after the first device is replaced based on the execution history stored by the job control unit, the first device and the second device being associated with the same device management identification information.

11. The device management system according to claim 10, wherein, if device management identification information is designated and a request to generate the report indicating the use state of a device associated with the device management identification information is input, the report generation unit is configured to generate the report indicating the use states of one or a plurality of devices associated with the device management identification information.

12. The device management system according to claim 10, wherein the report generation unit is configured to generate the report including an installation history of one or a plurality of devices associated with the device management identification information.

13. The device management system according to claim 10, wherein the report generation unit is configured to generate the report for identifying a use state of each function of one or a plurality of devices associated with the device management identification information.

14. The device management system according to claim 10, wherein the report generation unit is configured to generate the report indicating a use state of one or a plurality of devices for each predetermined period.

15. The device management system according to claim 10, wherein the report generation unit is configured to generate the report in which the use state is expressed as a graph.

16. A device management method involving one or more computers and for managing a plurality of devices connected to each other via a network, the device management method comprising:
   holding, in association with each piece of device-specific identification information indicating identification information specific to corresponding one of the plurality of devices, device type information indicating a device type of the device and installation place information indicating an installation place of the device;
   extracting, in response to receiving a replacement request for a device, which includes device-specific identification information, device type information and installation place information held in association with the device-specific identification information included in the replacement request;
   transmitting the extracted device type information and the extracted installation place information to an external apparatus, and acquiring installation planned device-specific identification information indicating identification information specific to a device that is planned to be replaced with the former device, from the external apparatus;
   holding, in association with each piece of device management identification information indicating identification information for managing corresponding one of the plurality of devices, a device state indicating an installation state or an operating state of the device, device-specific identification information, and installation planned device-specific identification information;
   in response to receiving an installation request for a device, which includes the device-specific identification information, determining whether there is device management identification information held in association with installation planned device-specific identification information identical to the device-specific identification information included in the installation request, in the device management identification information held at the holding; and
   if it is determined that there is the device management identification information held in association at the determining, and an operating state that is specified by a device state held in association with the device management identification information is "being replaced", updating the device state from "being replaced" to "operating", replacing the device-specific identification information held in association with the device management identification information with the installation planned device-specific identification information and then eliminating the installation planned device-specific identification information to thereby replace the device-specific identification information associated with the device management identification information with the installation planned device-specific identification information.

17. The device management method according to claim 16, further comprising:
   receiving an operation for executing a job related to a predetermined function of a device;
   storing, in a storage unit storing device management identification information in association with device-specific identification information for identifying the device, an execution history of the job received at the receiving in association with the device management identification information; and
   generating a report indicating use states of a first device before the first device is replaced and a second device after the first device is replaced based on the execution history stored at the storing, the first device and the second device being associated with the same device management identification information.

18. A server apparatus comprising:
   a device information management unit configured to hold, in association with each piece of device-specific identification information indicating identification information specific to corresponding one of a plurality of devices, device type information indicating a device type of the device and installation place information indicating an installation place of the device;
   an extracting unit configured to, in response to receiving a replacement request for a device, which includes device-specific identification information, extract device type information and installation place information held in association with the device-specific identification information included in the replacement request;
   an acquisition unit configured to transmit the extracted device type information and the extracted installation place information to an external apparatus, and acquire installation planned device-specific identification information indicating identification information specific to a device that is planned to be replaced with the former device, from the external apparatus;
   a device mapping unit configured to hold, in association with each piece of device management identification information indicating identification information for managing corresponding one of the plurality of devices, a device state indicating an installation state or an operating state of the device, device-specific identification information, and installation planned device-specific identification information;
   a determining unit configured to, in response to receiving an installation request for a device, which includes device-specific identification information, determine whether there is device management identification information held in association with installation planned device-specific identification information identical to the device-specific identification information included in the installation request, in the device management identification information held by the device mapping unit; and
   an update unit configured to, if the determining unit determines that there is the device management identification information held in association, and an operating state that is specified by a device state held in association with the device management identification information is "being replaced", update the device state from "being replaced" to "operating", replace the device-specific identification information held in association with the device management identification information with the installation planned device-specific identification information and then eliminate the installation planned device-specific identification information to thereby replace the device-specific identification information associated with the device management identification information with the installation planned device-specific identification information.

\* \* \* \* \*